Oct. 31, 1972  C. R. BARR ET AL  3,701,783
CERTAIN MERCAPTAN FORMING COUPLERS
Original Filed April 4, 1963  4 Sheets-Sheet 1

DYE

DYE

DYE

SILVER

Charles R. Barr
John Williams
Keith E. Whitmore
INVENTORS

BY R. Frank Smith
James R. Frederick
ATTORNEYS

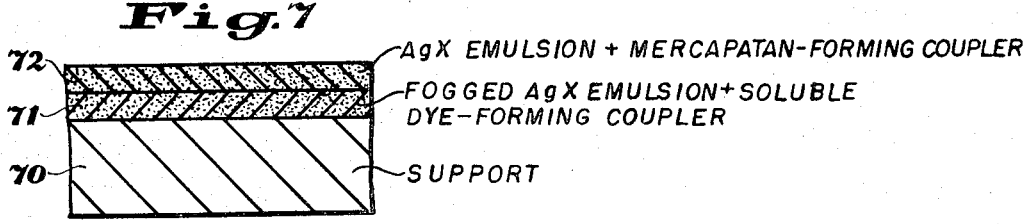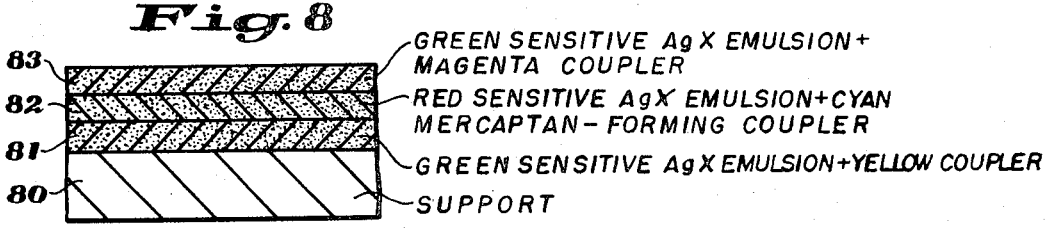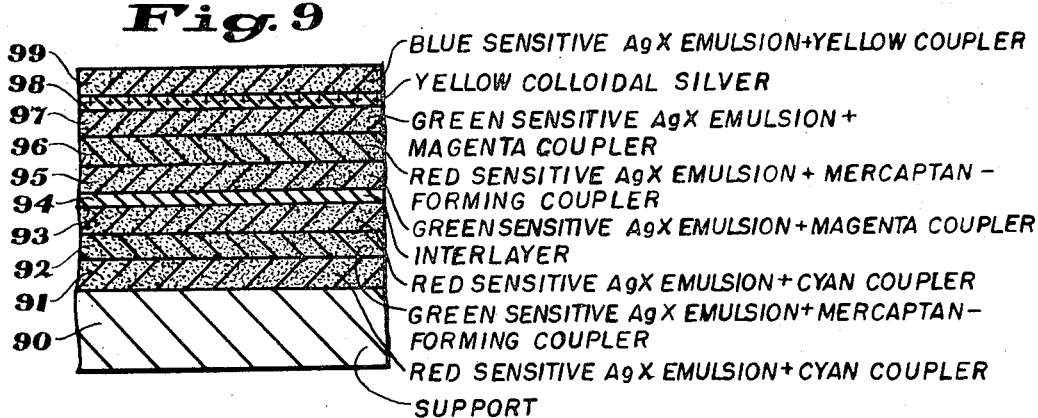

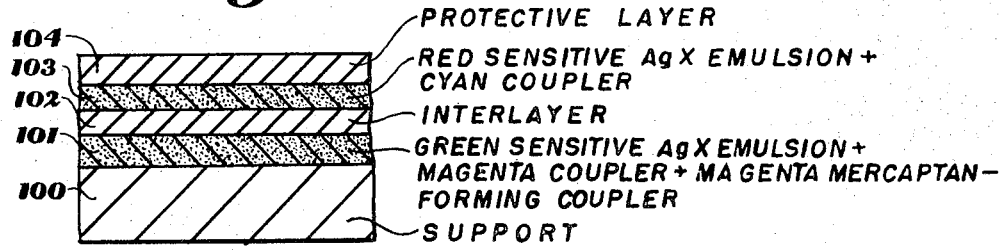
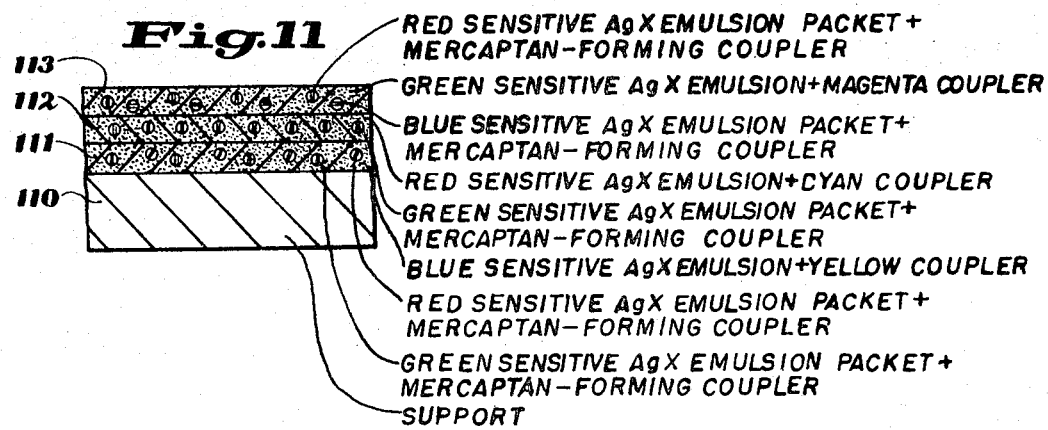
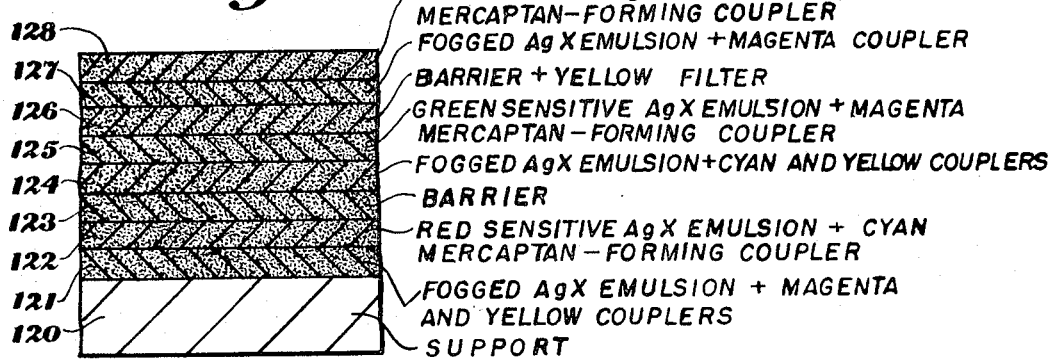

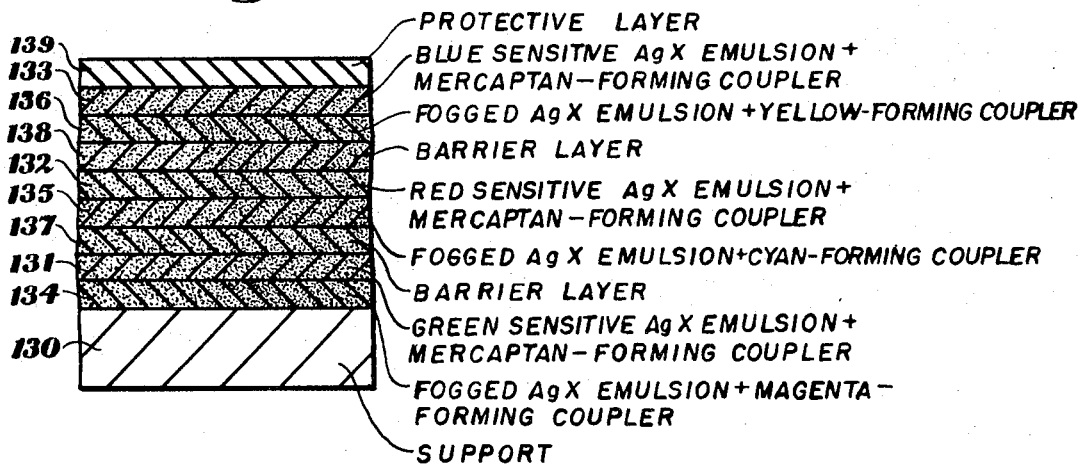
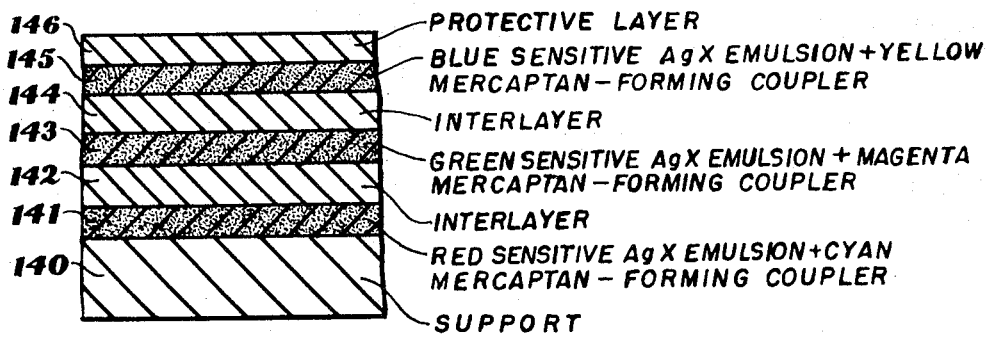

United States Patent Office 3,701,783
Patented Oct. 31, 1972

3,701,783
CERTAIN MERCAPTAN-FORMING COUPLERS
Charles R. Barr, John Williams, and Keith E. Whitmore, Rochester, N.Y., assignors to Eastman Kodak Company, Rochester, N.Y.
Division of application Ser. No. 270,709, Apr. 4, 1963, now Patent No. 3,227,554, which is a continuation-in-part of applications Ser. No. 817,860, June 3, 1959, now abandoned, Ser. No. 126,783, June 29, 1961, now abandoned, and Ser. No. 244,774, Dec. 14, 1962, now Patent No. 3,227,551. This application June 14, 1965, Ser. No. 507,975
The portion of the term of the patent subsequent to Jan. 4, 1983, has been disclaimed
Int. Cl. C07d 55/56
U.S. Cl. 260—308 D                     14 Claims

ABSTRACT OF THE DISCLOSURE

Certain mercaptan-forming or thioether couplers having the general formula COUP—S—R wherein COUP is a photographic coupler radical, S is a monothio radical attached to the coupling position of the coupler moiety and R is an organic radical.

---

Figure 1A:
Figure 1B:
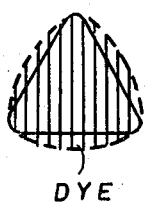

This is a division of application Ser. No. 270,709, filed on Apr. 4, 1963 and now U.S. Pat. No. 3,227,554, which application in turn was a continuation-in-part of applications Ser. Nos. 244,774, filed on Dec. 14, 1962, now U.S. Pat. No. 3,227,551, 126,783 filed on June 29, 1961, now abandoned, and 817,860, filed June 3, 1959, now abandoned.

This invention relates to photography, and more particularly, to photographic elements and processes utilizing a new class of photographic color couplers.

Photographic color couplers are well known in the art. Such couplers are generally 5-pyrazolone, phenolic, or open-chain ketomethylene compounds that react with oxidized color developing agents such as p-phenylenediamines to form dyes. Such photographic couplers have found wide use in the field of color photography for producing color images.

It is an object of this invention to provide novel photographic elements and processes utilizing a novel class of photographic color couplers.

It is another object of this invention to provide novel photographic elements and processes using color couplers that react with oxidized color developing agent to form mercaptan compounds as well as dyes.

It is another object of this invention to provide new photographic elements and processes using new photographic color couplers that release diffusible development inhibitors on reaction with oxidized photographic color developing agents.

It is another object of this invention to provide a new method for controlling contrast, grain size and sharpness in processing photographic silver halide emulsions.

It is another object of this invention to provide novel photographic elements useful for preparing positive color images when used in diffusion transfer processes.

It is another object of this invention to provide novel photographic elements containing mercaptan-forming couplers, the mercaptan-forming couplers being utilized for color correction purposes.

It is likewise an object of this invention to provide a novel method for processing black-and-white emulsions.

It is an additional object of this invention to provide photographic elements containing novel photographic couplers that release silver halide complexing materials as well as dyes when reacted with oxidized photographic color developing agents.

These and other objects of the invention are attained with mercaptan-forming or thioether couplers having the general formula COUP—S—R wherein COUP is a photographic coupler radical, S is a monothio radical attached to the coupling position of the coupler moiety and R is an organic radical attached to the monothio radical by a nonfunctional linkage that does not couple with oxidized photographic color developing agents. On reaction with oxidized color developing agents (aromatic primary amino compounds), such couplers form a dye consisting of the COUP moiety and the oxidized color developing moiety, and a mercaptan (R—SH). The use of a photographic coupler that forms a mercaptan is a novel feature of the present invention. Such formed mercaptans can be utilized as silver halide reactants and to control development of silver halide in photographic elements. The dyes formed with the present couplers can also be used to produce useful photographic images.

The radical, COUP, is a photographic color coupler radical such as a 5-pyrazolone coupler radical, a phenolic coupler radical including α-naphthols, or an open-chained ketomethylene coupler radical, such couplers reacting with oxidized color developing agents to generally form magenta, cyan and yellow dyes respectively. As noted above, the monothio radical is substituted in the coupling position of such couplers, the coupling position being well known to those skilled in the photographic art. The 5-pyrazolone coupler radicals couple at the carbon atom in the 4-position, the phenolic coupler radicals couple at the carbon atom in the 4-position and the open-chain ketomethylene coupler radicals couple at the carbon atom forming the methylene moiety (e.g.,

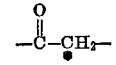

* denoting the coupling position).

A wide variety of organic radicals can be utilized for the R substituent. The monothio radical is attached to the R substituent at a carbon atom that does not couple with oxidized color developing agent. The R substituent is incapable of forming a dye with oxidized color developing agent and is typically an alkyl radical (generally an alkyl radical having about 6 to 22 carbon atoms), an aryl radical (generally a phenyl or naphthyl radical), a cycloalkane radical (generally having 5 to 6 carbon atoms), or a carbon-containing heterocyclic radical (generally a 5 to 6 membered ring containing at least one heteronitrogen, oxygen or sulfur atom and preferably 1 to 4 hetero-nitrogen atoms). Typical suitable substituents for such aryl, cycloalkane or heterocyclic radicals include nitro, chloro, alkyl, alkylamido, alkoxy, alkylsulfoamido, α-chloroacetylthio, alkylcarbamyl, amino, and the like moieties. Typical suitable heterocyclic radicals include tetrazolyls, triazinyls, triazolyls, oxazolyls, oxadiazolyls, diazolyls, thiazyls, thiadiazolyls, benzoxazolyls, benzotriazolyls, benzothiazolyls, pyrimidyls, pyridinyls, quinolinyls and the like.

With the utilization of ballasting and solubilizing groups in accordance with practice well known to those skilled in the photographic coupler art, mercaptan-forming couplers suitable for a wide variety of purposes can be prepared. The subject mercaptan-forming couplers can thus be made either diffusible or nondiffusible in aqueous alkaline photographic processing compositions. Similarly, the mercaptan or the dye formed on reacting the subject mercaptan-forming couplers with oxidation product of color developing agents can be made either diffusible or nondiffusible in aqueous alkaline photographic processing compositions. The nature of the ballasting and solubilizing groups used on the COUP moiety or the R moiety of the present mercaptan-forming couplers can be widely varied.

Ballasting groups contain "bulky" organic moieties such as alkyl radicals or groups of alkyl radicals typically having a total of about 8–22 or more carbon atoms attached to the moieties being ballasted. Typical suitable solubilizing groups include such acidic groups as carboxyl, sulfonyl, ionizable sulfonamido and hydroxyl-substituted groups that lend negative charges to the moieties being solubilized.

The term "nondiffusible" used herein as applied to couplers and products derived from couplers has the meaning commonly applied to the term in color photography and denotes materials which for all practical purposes do not migrate or wander through photographic hydrophilic colloid layers, such as gelatin, particularly during processing in aqueous alkaline solutions. The same meaning is attached to the term "immobile." The terms "diffusible" and "mobile" have the converse meaning.

The various mercaptan moieties that can be attached through the sulfur atoms of their mercapto groups to the coupling position of the COUP moieties include the mercaptans described in the following patents:

mercaptoalkylamidobenzothiazoles — U.S.P. 2,503,861, Apr. 11, 1950
mercaptoalkylamidothiazoles — U.S.P. 2,657,136, Oct. 27, 1953, U.S.P. 2,697,099, Dec. 14, 1954
mercaptoazines and azoles, etc.—U.S.P. 2,573,027, Oct. 30, 1951
mercaptoazoles—U.S.P. 2,131,038, Sept. 27, 1938, U.S.P. 2,353,754, July 18, 1944, U.S.P. 2,432,865, Dec. 16, 1947, U.S.P. 2,453,346, Nov. 9, 1948, U.S.P. 2,566,659, Sept. 4, 1951, U.S.P. 2,668,113, Feb. 2, 1954, U.S.P. 2,590,775, Mar. 25, 1952
mercaptocysteines—U.S.P. 2,363,777, Nov. 28, 1944
mercaptoglutathiones—U.S.P. 2,110,178, Mar. 8, 1938
mercaptooxadiazoles—U.S.P. 2,843,491, July 15, 1958
mercaptopyrimidines, etc.—U.S.P. 2,173,628, Sept. 19, 1939, U.S.P. 2,231,127, Feb. 11, 1948, U.S.P. 2,232,707, Feb. 25, 1941, U.S.P. 2,304,962, Dec. 15, 1942
mercaptotetrazoles — U.S.P. 2,403,927, July 16, 1946, U.S.P. 2,453,087, Nov. 2, 1948, U.S.P. 2,465,149, Mar. 22, 1949, U.S.P. 2,697,040, Dec. 14, 1954
mercaptothiadiazoles—U.S.P. 2,743,184, Apr. 24, 1956
mercaptothiazoles — U.S.P. 2,759,821, Aug. 21, 1956, U.S.P. 2,824,001, Feb. 18, 1958
mercaptothiophenes — U.S.P. 1,758,576, May 13, 1930, U.S.P. 2,214,446, Sept. 10, 1940
mercaptotriazines—U.S.P. 2,476,536, July 19, 1949
mercaptotriazoles, etc.—Aust. P. 125,480, Nov. 26, 1943
misc. mercaptans—U.S.P. 3,017,270, Jan. 16, 1962

Preferred mercaptan moieties attached through their sulfur atom to the coupling position of the COUP moiety of the present mercaptan-forming couplers include: alkylcarbamylphenylthio and desirably 3-higher alkylcarbamylphenylthio wherein the alkyl moiety has 6 to 22 carbon atoms (e.g., 3-octadecylcarbamylphenylthio); 1-phenyl-5-tetrazolylthio; nitrophenylthio such as 2 - nitrophenylthio and 4-nitrophenylthio; aminophenylthio such as 2-aminophenylthio and 4-aminophenylthio; 2-benzothiazolylthio; and 5-phenyl-1,3,4-oxadiazolyl-2-thio.

The mercaptan-forming thioether couplers of the invention that are preferred have the following formulas:

Type A: SOL—COUP—S—R'
Type B: BALL—COUP—S—R' and
Type C: SOL—COUP—S—R''.

In the above formulas: BALL is a photographically inert organic radical of such molecular size and configuration as to render the coupler nondiffusible in the element in alkaline color developing solutions, such groups being ballast groups; COUP is a photographic color coupler radical having substituted in its coupling position a monothio radical; SOL is either a hydrogen atom or an acidic solubilizing group when the coupler is developed in the presence of a photographic alkaline color developing composition containing an aromatic primary amino color developing agent having an acidic solubilizing agent, SOL always being an acidic solubilizing radical when the color developing agent is free of an acidic solubilizing group; R' is a diffusible species of R described in detail above, R' being unballasted; and R'' is a nondiffusible species of R described above, R'' being ballasted. Type A couplers are diffusible couplers of the type typically used in developing compositions and which release diffusible dyes and mercaptans on reaction with oxidized color developing agents. Type B couplers are nondiffusible couplers of the type utilized in photographic elements and which release nondiffusible dyes and diffusible mercaptans on reaction with oxidized color developing agents. Type C couplers are nondiffusible couplers of the type utilized in photographic elements and which release diffusible dyes and nondiffusible mercaptans on reaction with oxidized color developing agents.

The following list of compounds are typical mercaptan-forming compounds utilized in the present invention.

Coupler Number

I—1-hydroxy-4-phenylthio-N-[δ-(2,4-di-tert-amylphenoxy)butyl]-2-naphthamide
II—1-hydroxy-4-(2-nitrophenylthio)-N-[δ-(2,4-di-tert-amylphenoxy)butyl]-2-naphthamide
III—1-hydroxy-4-(4-nitrophenylthio)-N-[δ-(2,4-di-tert-amylphenoxy)butyl]-2-naphthamide
IV—1-hydroxy-4-(2-aminophenylthio)-N-[δ-(2,4-di-tert-amylphenoxy)butyl]-2-naphthamide
V—1-hydroxy-4-(4-aminophenylthio)-N-[δ-(2,4-di-tert-amylphenoxy)butyl]-2-naphthamide
VI—1-hydroxy-4-(4-acetamidophenylthio)-N-[δ-(2,4-di-tert-amylphenoxy)-butyl]-2-naphthamide
VII—1-hydroxy-4-[2-(diethylcarbamyl)phenylthio]-N-[δ-(2,4-di-tert-amylphenoxy)butyl]-2-naphthamide
VIII—1-hydroxy-4-(2-methylsulfonamidophenylthio)-N-[δ-(2,4-di-tert-amylphenoxy)butyl]-2-naphthamide
IX—1-hydroxy-4-(4-methylsulfonamidophenylthio)-N-[δ-(2,4-di-tert-amylphenoxy)butyl]-2-naphthamide
X—1-hydroxy-4-(2-benzothiazolylthio)-N-[δ-2,4-di-tert-amylphenoxy)butyl]-2-naphthamide
XI—1-hydroxy-4-(1-phenyl-5-tetrazolylthio)-N-[δ-(2,4-di-tert-amylphenoxy)butyl]-2-naphthamide
XII—1-hydroxy-4-(2-benzothiazolylthio)-N-octadecyl-3',5'-di-carboxy-2-naphthanilide
XIII—2-(3,5-dichlorosulfonyl-N-octadecylbenzamido)-5-methyl-4-(4-nitrophenylthio)phenol
XIV—1-hydroxy-4-(2-nitrophenylthio)-N-octadecyl-3',5'-di-carboxy-2-naphthanilide
XV—1-hydroxy-4-(4-nitrophenylthio)-N-butyl-2-naphthamide
XVI—1-hydroxy-4-(1-phenyl-5-tetrazolylthio)-2'-tetradecyloxy-2-naphthanilide
XVII—4-(1-phenyl-5-tetrazolylthio)phenol
XVIII—1-hydroxy-4-(1-phenyl-5-tetrazolylthio)-3',5'-di-carbomethoxy-2-naphthanilide
XIX—1-hydroxy-4-(1-phenyl-5-tetrazolylthio)-3',5'-di-carboxy-2-naphthanilide
XX—1-hydroxy-4-(1-phenyl-5-tetrazolylthio)-N-[β-(3,5-dichlorosulfonylbenzamido)ethyl]-2-naphthamide
XXI—1-hydroxy-4-(1-phenyl-5-tetrazolylthio)-N-[β-(3,5-disulfobenzamido)ethyl]-2-naphthamide dipotassium salt
XXII—1-hydroxy-4-(5-phenyl-1,3,4-oxadiazolyl-2-thio)-N-[β-(3,5-dichlorosulfonylbenzamido)ethyl]-2-naphthamide
XXIII—1-hydroxy-4-(5-phenyl-1,3,4-oxadiazolyl-2-thio)-N-[β-(3,5-disulfobenzamido)ethyl]-2-naphthamide dipotassium salt
XXIV—Phenyl 1-hydroxy-4-(1-phenyl-5-tetrazolylthio)-2-naphthoate
XXV—1-hydroxy-4-(1-phenyl-5-tetrazolylthio)-5'-carbomethoxy-2'-methoxy-2-naphthanilide XXVI—2-(3,5-dichlorosulfonylbenzamido)-5-methyl-4-(1-phenyl-5-tetrazolylthio)phenol XXVII—2-(3,5-disulfobenzamido)-5-methyl-4-(1-phenyl-5-tetrazolylthio)phenol dipotassium salt XXVIII—1-hydroxy-4-(1-phenyl-5-tetrazolylthio)-4'-(2,4-di-t-amylphenoxy)-2-naphthanilide XXIX—1-hydroxy-4-[1-(4-carbomethoxyphenyl)-5-tetrazolylthio]-N-[δ-(2,4-di-tert-amylphenoxy)butyl]-2-naphthamide XXX—1-hydroxy-4-(5-phenyl-1,3,4-oxadiazolyl-2-thio)-N-[δ-(2,4-di-tert-amylphenoxy)butyl]-2-naphthamide XXXI—1-hydroxy-4-(1-phenyl-5-tetrazolylthio)-2'-(2,4-di-tert-amylphenoxy)-5'-(3,5-dicarbomethoxyphenylcarbamyl)-2-naphthanilide XXXII—1-hydroxy-4-(1-phenyl-5-tetrazolylthio)-2'-(2,4-di-tert-amylphenoxy)-5'-(3,5-dicarboxyphenylcarbanilide XXXIII—1-hydroxy-4-(1-phenyl-5-tetrazolylthio)-3',5'-dicarbomethoxy-N-octadecyl-2-naphthanilide XXXIV—5-methoxy-2-[α-(3-n-pentadecylphenoxy)butyramido]-4-(1-phenyl-5-tetrazolylthio)phenol XXXV—1-phenyl-3-octadecylamino-4-[2-phenyl-5-(1,3,4)-oxadiazolylthio]-5-pyrazolone XXXVI—1-{4-[γ-(2,4-di-tert-amylphenoxy)butyramido]phenyl}-3-ethoxy-4-(1-phenyl-5-tetrazolylthio)-5-pyrazolone XXXVII—1-{4-[α-(3-pentadecylphenoxy)butyramido]phenyl}-3-ethoxy-4-(1-phenyl-5-tetrazolylthio)-5-pyrazolone XXXVIII—1-(2,4,6-trichlorophenyl)-3-{4-[α-(2,4-di-tert-amylphenoxy)butyramido]anilino}-4-(1-phenyl-5-tetrazolylthio)-5-pyrazolone XXXIX—1-phenyl-3-octadecylamino-4-(1-phenyl-5-tetrazolylthio)-5-pyrazolone XL—1-[4-(4-tert-butylphenoxy)phenyl]-3-phenyl-4-(1-phenyl-5-tetrazolylthio)-5-pyrazolone XLI—1-phenyl-3-pentadecyl-4-(1-phenyl-5-tetrazolylthio)-5-pyrazolone XLII—1-(4-stearamidophenyl)-3-ethoxy-4-(1-phenyl-5-tetrazolylthio)-5-pyrazolone XLIII—1-[4-(4-tert-butylphenoxy)phenyl]-3-[α-(4-tert-butylphenoxy)propionamido]-4-(1-phenyl-5-tetrazolylthio)-5-pyrazolone XLIV—1-[4-(4-tert-butylphenoxy)phenyl]-3-[α-(4-tert-butylphenoxy)propionamido]-4-(5-phenyl-1,3,4-oxadiazolyl-2-thio)-5-pyrazolone XLV—1-[4-(4-tert-butylphenoxy)phenyl]-3-[α-(4-tert-butylphenoxy)propionamido]-4-(2-nitrophenylthio)-5-pyrazolone XLVI—1-[4-(4-tert-butylphenoxy)phenyl]-3-[α-(4-tert-butylphenoxy)propionamido]-4-[1-(4-carbomethoxyphenyl)-5-tetrazolylthio]-5-pyrazolone XLVII—1-[4-(4-tert-butylphenoxy)phenyl]-3-[α-(4-tert-butylphenoxy)propionamido]-4-(2-benzothiazolylthio)-5-pyrazolone XLVIII—1-[4-(4-tert-butylphenoxy)phenyl]-3-[α-(4-tert-butylphenoxy)propionamido]-4-(2-carbethoxyphenylthio)-5-pyrazolone XLIX—1-[4-(4-tert-butylphenoxy)phenyl]-3-[α-(4-tert-butylphenoxy)propionamido]-4-(2-carboxyphenylthio)-5-pyrazolone L—1-[4-(4-tert-butylphenoxy)phenyl]-3-[α-(tert-butylphenoxy)propionamido]-4-(2-benzoxazolylthio)-5-pyrazolone LI—1-(2,4-dichloro-6-methoxyphenyl)-3-[α-(3-pentadecylphenoxy)acetamido]-4-(1-phenyl-5-tetrazolylthio)-5-pyrazolone LII—1-(2,4-dichloro-6-methoxyphenyl)-3-[α-(3-pentadecylphenoxy)acetamido]-4-(3-octadecylcarbamylphenylthio)-5-pyrazolone LIII—1-dodecyl-3-[α-(2,4-di-tert-amylphenoxy)acetamido]-4-(1-phenyl-5-tetrazolylthio)-5-pyrazolone LIV—1-hexyl-3-[α-(2,4-di-n-amylphenoxy)acetamido]-4-(1-phenyl-5-tetrazolylthio)-5-pyrazolone LV—1-phenyl-3-benzamido-4-(1-phenyl-5-tetrazolylthio)-5-pyrazolone LVI—1-phenyl-3-[α-(2,4-di-tert-amylphenoxy)acetamido]-4-(1-phenyl-5-tetrazolylthio)-5-pyrazolone LVII—1-phenyl-3-[γ-(2,4-di-tert-amylphenoxy)butyramido]-4-(1-phenyl-5-tetrazolylthio)-5-pyrazolone LVIII—1-phenyl-3-(3,5-dicarbethoxybenzamido)-4-(4-nitrophenylthio)-5-pyrazolone LIX—1-phenyl-3-octadecylcarbamyl-4-methyl-4-(1-phenyl-5-tetrazolylthio)-5-pyrazolone LX—1-(2,4,6-trichlorophenyl)-3-{3-[α-(2,4-di-tert-amylphenoxy)acetamido]benzamido}-4-(1-phenyl-5-tetrazolylthio)-5-pyrazolone LXI—1-(2,4,6-trichlorophenyl)-3-{3-[α-(2,4-di-tert-amylphenoxy)acetamido]benzamido}-4-(3-octadecylcarbamylphenylthio)-5-pyrazolone LXII—1-(2,4,6-trichlorophenyl)-3-pentadecyl-4-(1-phenyl-5-tetrazolylthio)-5-pyrazolone LXIII—α-Benzoyl-α-phenylthio-4-[N-(γ-phenylpropyl)-N-(p-tolyl)sulfamyl]acetanilide LXIV—α-Benzoyl-α-(4-nitrophenylthio)-4-[N-(γ-phenylpropyl)-N-(p-tolyl)-sulfamyl]acetanilide LXV—α-Benzoyl-α-(3-octadecylcarbamylphenylthio)-4-[N-(p-tolyl)-N-(γ-phenylpropyl)sulfamyl]acetanilide LXVI—α-Benzoyl-α-(2-benzothiazolylthio)-4-[N-(γ-phenylpropyl)-N-(p-tolyl)sulfamyl]acetanilide LXVII-α-Benzoyl-α-(o-nitrophenylthio)-3,5-dicarboxyacetanilide LXVIII—α-Benzoyl-α-(2-carboxyphenylthio)acetophenone LXIX—α-{3-[α-(2,4-di-tert-amylphenoxy)butyramido]benzoyl}-α-phenylthio-2-methoxyacetanilide LXX—α-Benzoyl-α-phenylthio-3,5-dicarboxyacetanilide LXXI—α-Benzoyl-α-(4-chlorophenylthio)-3,5-dicarboxyacetanilide LXXII—2-(3,5-disulfobenzamido)-5-methyl-4-(3-octadecylcarbamylphenylthio)phenol dipotassium salt LXXIII—1-[4-(3,5-dicarboxybenzamido)phenyl]-3-ethoxy-4-(3-octadecylcarbamylphenylthio)-5-pyrazolone LXXIV—1-methyl-3-(3,5-dicarboxybenzamido)-4-(3-octadecylcarbamylphenylthio)-5-pyrazolone LXXV—1-methyl-3-[α-(3,5-dicarboxyphenoxy)acetamido]-4-(3-octadecylcarbamylphenylthio)-5-pyrazolone LXXVI—1-phenyl-3-(3,5-dicarboxybenzamido)-4-(3-octadecylcarbamylphenylthio)-5-pyrazolone LXXVII—1-phenyl-3-(3,5-dicarboxyanilino)-4-(3-octadecylcarbamylphenylthio)-5-pyrazolone LXXVIII—1-(4-sulfophenyl)-3-(4-sulfoanilino)-4-(3-octadecylcarbamylphenylthio)-5-pyrazolone disodium salt LXXIX—1-phenyl-3-[N'-(α,β-dicarboxyethyl)ureido]-4-(3-octadecylcarbamylphenylthio)-5-pyrazolone XXC—1-(4-fluosulfonylphenyl)-3-[N'-(4-fluosulfonylphenyl)ureido]-4-(3-octadecylcarbamylphenylthio)-5-pyrazolone XXCI—1-phenyl-3-[N'-(3,5-dicarboxyphenyl)ureido]-4-(3-octadecylcarbamylphenylthio)-5-pyrazolone XXCII—α-{5-[N-(3,5-dicarboxyphenyl)-N-ethylsulfamyl]coumaronyl-2}-α-(3-octadecylcarbamylphenylthio)acetonitrile XXCIII—α-(X-sulfo-2-thienylcarbonyl)-α-(β-octadecylcarbamylphenylthio)acetonitrile potassium salt XXCIV—α-Benzoyl-α-(3-octadecylcarbamylphenylthio)-4-(3,5-disulfobenzamido)acetanilide disodium salt XXCV—α-Benzoyl-α-(3-octadecylcarbamylphenylthio)-4-sulfoacetanilide potassium salt XXCVI—α-Benzoyl-α-(3-octadecylcarbamylphenylthio)-3,5-dicarboxyacetanilide XCVII—α-Benzoyl-α-(3-octadecylcarbamylphenylthio)-3-(3,5-disulfobenzamido)acetanilide dipotassium salt XXCVIII—α-(2-methoxy-X-sulfobenzoyl)-α-(3-octadecylcarbamylphenylthio)-X-sulfoacetanilide dipotassium salt XXCIX—α-Benzoyl-α-(3-octadecylcarbamylphenylthio)-4-(3,5-dicarboxyphenylsulfamyl)acetanilide XC—α-Benzoyl-α-(3-octadecylcarbamylphenylthio)-4-(N-methyl-N-β-sulfoethylsulfamyl)acetanilide sodium salt XCI—α-(2,4,6-trimethylbenzoyl)-α-(3-octadecylcarbamylphenylthio)-3,5-dicarboxyacetanilide XCII—α-(2,6-dimethyl-4-methoxybenzoyl)-X-(3-octadecylcarbamylphenylthio)-3,5-dicarboxyacetanilide XCIII—α-Benzoyl-α-(3-octadecylcarbamylphenylthio)-2-chloro-4-(3,5-disulfobenzamido)acetanilide XCIV—α-(3,5-dichlorobenzoyl)-α-(3-octadecylcarbamylphenylthio)-3,5-dicarboxyacetanilide XCV—α-(2-fluorobenzoyl)-α-(3-octadecylcarbamylphenylthio)-3,5-disulfoacetanilide dipotassium salt XCVI—α-Benzoyl-α-(4-methoxy-3-octadecylcarbamylphenylthio)-3,5-dicarboxyacetanilide XCII—α-(2,6-dimethyl-4-methoxybenzoyl)-X-(3-octa-4-methoxy-3-sulfoacetophenone XCVIII—α-(2-methoxy-5-sulfobenzoyl)-α-(3-octadecylcarbamylphenylthio)acetomorpholide potassium salt XCIX—α-Acetyl-α-(3-octadecylcarbamylphenylthio)-4-sulfoacetanilide potassium salt C—α-(2-benzofuroyl)-α-(3-octadecylcarbamylphenylthio)-3,5-dicarboxyacetanilide CI—α-(2-thienylcarbonyl)-α-(3-octadecylcarbamylphenylthio)-4-sulfoacetanilide potassium salt CII—α-(2-furoyl)-α-(3-octadecylcarbamylphenylthio)-4-sulfoacetanilide potassium salt CIII—α-(2-naphthoyl)-α-(3-octadecylcarbamylphenylthio)-4-sulfoacetanilide sodium salt CIV—α-Benzoyl-α-(3-octadecylcarbamylphenylthio)-N-ethyl-3,5-dicarboxyacetanilide CV—α-Benzoyl-α-dodecylthio-3,5-dicarboxyacetanilide CVI—α-Benzoyl-α-(3-octadecylcarbamylphenylthio)-2-methoxy-X-sulfoacetanilide potassium salt CVII—α-Benzoyl-α-(3-octadecylcarbamylphenylthio)-3,5-dicarbomethoxyacetanilide CVIII—α-(2-furoyl)-α-(3-octadecylcarbamylphenylthio)-3,5-disulfoacetanilide dipotassium salt CIX—α-{3-[γ-(2,4-di-tert-amylphenoxy)butyramido]benzoyl}-α-(1-phenyl-5-tetrazolylthio)-2-chloroacetanilide CX—α-{3-[α-(2,4-di-tert-amylphenoxy)acetamido]benzoyl}-α-(1-phenyl-5-tetrazolylthio)-2-fluoroacetanilide CXI—α-{3-[γ-(2,4-di-tert-amylphenoxy)butyramido]benzoyl}-α-(2-benzoxazolylthio)-2-methoxyacetanilide CXII—α-Benzoyl-α-[1-(3-pelargonamidophenyl)-5-tetrazolylthio]acetanilide CXIII—1-hydroxy-4-(3-octadecylcarbamylphenylthio)-3′,5′-dicarboxy-2-naphthanilide CXIV—α-Benzoyl-α-(4-octadecylcyclohexylthio)-3,5-dicarboxyacetanilide CXV—1-hydroxy-4-(1-phenyl-5-tetrazolylthio)-2-naphthoic acid CXVI—1-hydroxy-4-(4-benzotriazolylthio)-N-[δ-(2,4-di-tert-amylphenoxy)butyl]-2-naphthamide CXVII—1-hydroxy-4-[2-(α-chloroacetylthio)phenylthio]-N-[δ-(2,4-di-tert-amylphenoxy)butyl]-2-naphthamide For purposes of convenience, the above mercaptan-releasing couplers are referred to herein by their indicated Roman numerals. Couplers I–LXXI, CIX–CXII and CXV–CXVII are couplers that release diffusible mercaptans as well as diffusible or nondiffusible dyes when reacted with oxidized color developing agents and have utility as development inhibitors in photographic color diffusion transfer processes, in color correcting, masking and the like uses. Couplers LXXII–CVIII, CXIII and CXIV release nondiffusible mercaptans and diffusible dyes and have particular utility in photographic color diffusion transfer processes.

The photographic elements of the invention comprise photographic supports having coated thereon at least one silver halide emulsion layer and at least one of the described mercaptan-forming couplers. The present mercaptan-forming couplers can be positioned on photographic elements so that during processing in aqueous alkaline color developing solutions color developing agent oxidized on developing silver halide on the photographic element reacts with the mercaptan-forming couplers. Accordingly, the present mercaptan-forming couplers can be integral with and contiguous to the silver halide by being either incorporated in the silver halide emulsion or in a separate layer contiguous thereto. Also, the present mercaptan-forming couplers can be separated from silver halide emulsion layers by layers of a hydrophilic colloid such as gelatin or related layers through which oxidized developing agents can readily diffuse in the presence of aqueous alkaline processing solutions. Mercaptan-forming couplers of the invention that release diffusible mercaptans useful for inhibiting silver halide development as well as those that release nondiffusible or ballasted mercaptan compounds are contemplated by our invention. These latter compounds, while being immobile during processing, can be utilized as silver halide complexing agents to form insoluble or immobile silver complexes in the element. Mercaptan-forming couplers that release nondiffusible mercaptans are of particular interest in forming image dyes, especially diffusible image dyes useful in diffusion transfer processes such as described in our copending application, U.S. Ser. No. 244,774 filed Dec. 14, 1962, French Pats. 75,676 and 1,293,709 delivered June 19, 1961 and Apr. 4, 1962 respectively.

The photographic elements of the invention can have coated thereon a wide variety of well-known photographic silver halide emulsions. Typical suitable silver halide emulsions include silver chloride, silver bromide, silver bromoiodide, silver chloroiodide, and silver chlorobromoiodide emulsions. Both conventional negative-type silver halide emulsions and direct-positive silver halide emulsions can be utilized in preparing the photographic elements of our invention. Suitable direct-positive emulsions include emulsions that form latent images predominantly inside the silver halide grains and solarizing silver halide emulsions. Such emulsions are well known to those skilled in the art. Reference is made to U.S. Pats. 2,184,013 and 2,592,250 for descriptions of suitable direct-positive emulsions.

In preparing silver halide emulsions or dispersions used in the photographic elements of the invention a wide variety of organic hydrophilic dispersing agents or substrates for the silver halide can be utilized. Gelatin is preferred although other colloidal materials such as colloidal albumin, cellulose derivatives or synthetic resins such as polyvinyl alcohol can also be utilized. Such hydrophilic colloidal materials are also typically utilized in the non-light-sensitive layers of the photographic elements of the invention. Such non-light-sensitive layers include interlayers or barrier layers or layers containing the mercaptan-forming couplers of the invention.

In preparing the photographic elements of the invention, the above-described silver halide emulsions can be coated on a wide variety of photographic supports. Typical supports include cellulose nitrate film, cellulose acetate film, polyvinyl acetal film, polystyrene film, polyterephthalate film, polyethylene film, polypropylene film, polyethylene-coated paper, paper, glass and others.

The photographic silver halide emulsions and other layers on the present photographic elements can contain the addenda generally utilized in such elements including optical sensitizers, speed-increasing materials, antifoggants, coating aids, gelatin hardeners, plasticizers, ultraviolet absorbers and the like.

The photographic elements of the invention are developed with photographic alkaline color developing solutions containing aromatic primary amino color developing agents. Such developing agents are well known in the art and typically are p-phenylenediamines. Suitable color developing agents include 3-acetamido-4-amino-N,N-diethylaniline, p-amino-N-ethyl-N-β-hydroxyethylaniline sulfate, p-aminoethyl-β-hydroxyaniline, N,N-diethyl-p-phenylenediamine, 2-amino-5-diethylaminotoluene, N-ethyl-β-methanesulfonamidoethyl - 3 - methyl - 4 - aminoaniline, 4-amino-N-ethyl-3-methyl-N-(β-sulfoethyl)aniline and the like. Reference is also made to Bent et al., JACS 73, 3100–3125 (1951) for additional typical suitable color developing agents. Diffusible mercaptan-forming couplers of the invention can be suitably utilized in the color developing solution if desired, rather than utilizing such couplers in the photographic element being processed.

FIGS. 1A–D of the drawings illustrate the development of silver halide crystals by varying development techniques including the techniques of the invention. FIG. 2 of the drawings illustrates typical characteristic curves ("H & D" curves) of silver halide emulsions developed by various techniques including development techniques of the invention. FIGS. 3 to 14 illustrate fragmentary views of sectional elevations of typical light-sensitive elements of the invention containing the present mercaptan-forming couplers.

Figure 2:
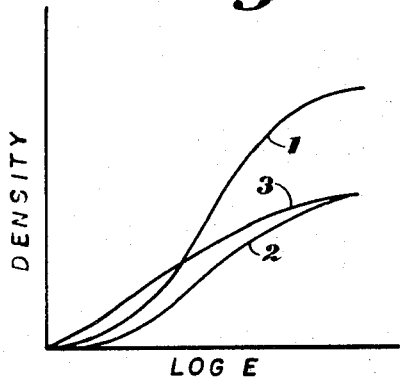

It is known in color photography that upon development of silver halide emulsions with color developing agents in the presence of coupler compounds, the dye obtained by reaction of the oxidized developing agent with the coupler at the site of exposure surrounds the silver halide crystal in a somewhat diffuse manner as illustrated by the silver halide crystals of FIG. 1A of the drawings. This results in more grain and less definition being obtained in the dye images than is desired. A typical characteristic curve of such dye images is illustrated by curve 1 in FIG. 2 of the drawings.

Weller et al. disclosed in U.S. Pat. 2,689,793 that substantial improvement in grain can be obtained by the use of increased amounts of silver halide in photographic emulsions and the concomitant use in conjunction with the usual nondiffusing image-forming couplers competing couplers of the type which form diffusible dyes with oxidized color developing agent. As a result, some of the exposed silver halide is expended in the formation of the diffusible dye and the remaining silver halide is used in forming the nondiffusing image dye. In such a process wherein a competing coupler is utilized, the nondiffusing dye is distributed less diffusely about the silver halide crystal in the manner illustrated by the silver halide crystal in FIG. 1B of the drawings. A typical characteristic curve of such a dye image is illustrated by curve 2 in FIG. 2 of the drawings. An appreciable lowering of speed has occurred which is most evident in the toe region of the characteristic curve.

Figure 1C:
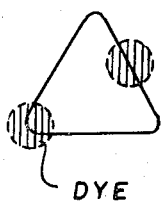
Figure 1D:
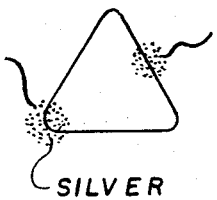

We have found that when color development is carried out in the presence of the mercaptan-forming couplers described herein that release development inhibiting compounds, such development inhibitors locally inhibit development of the silver halide crystals and dye images are distributed about the silver halide crystal as illustrated by the silver halide crystal in FIG. 1C of the drawings. This results in substantial improvement in grain. Development in the presence of the present mercaptan-forming couplers or development inhibitor-releasing couplers takes place at a number of development centers in each grain causing growth of a corresponding number of silver grains as illustrated by FIG. 1D of the drawings wherein are shown two silver grains and their filamentary silver appendages. Upon fixation of such an emulsion, the undeveloped portion of the silver halide grain is removed, leaving in this instance two small silver grains rather than a large silver grain. Accordingly, the dye images formed about such grains during development are distributed as illustrated in FIG. 1C of the drawings. A typical characteristic curve of such dye images is illustrated by curve 3 in FIG. 2 of the drawings. As can be observed, the use of the marcaptan-forming coupler during the developing has lowered the contrast of the dye image and the speed of the toe region has been increased. A similar effect is attained when ordinary black-and-white emulsions are developed with color developing agents in the presence of the present development inhibitor-releasing couplers, to wit, the contrast of the characteristic curve and the grain of the silver image are reduced.

Figure 3:
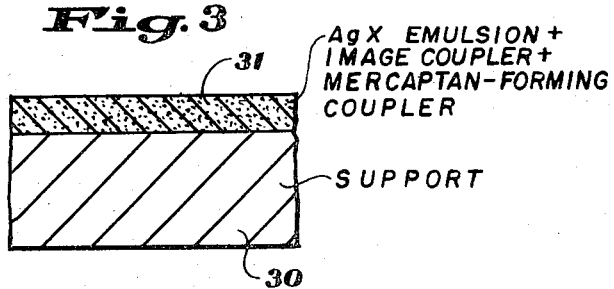

FIG. 3 illustrates a typical light-sensitive element of the invention comprising support 30 having coated thereover silver halide emulsion layer 31 containing a nondiffusible image-forming coupler and a mercaptan-forming coupler of the invention that releases a diffusible development inhibiting mercaptan on color development. On development with a photographic color developing agent, the effect as illustrated in FIG. 1C and curve 3 of FIG. 2 of the drawings is obtained.

Figure 4:
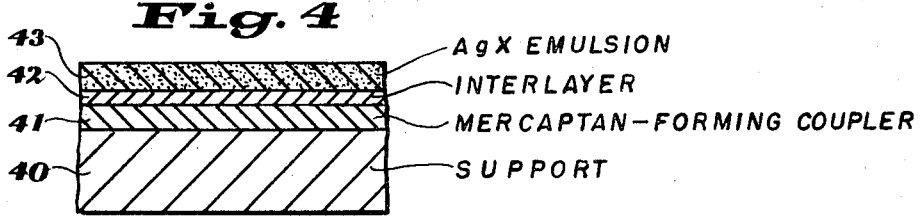

FIG. 4 of the drawings illustrates another typical light-sensitive element of the invention comprising support 40 having coated thereon layer 41 containing a mercaptan-forming coupler that releases a diffusible development inhibitor on reaction with oxidized color developing agent. Over layer 41 is coated interlayer 42. Over layer 42 is coated silver halide emulsion layer 43. On color development, oxidized color developer is formed in layer 43 which diffuses through layer 42 to react with the mercaptan-releasing coupler in layer 41 to form a diffusible mercaptan development inhibitor which diffuses to layer 43 to inhibit development of silver halide therein. Improved contrast of the characteristic curve and the grain of the silver image formed in layer 43 is obtained by the use of the mercaptan-forming coupler in layer 41.

Figure 5:
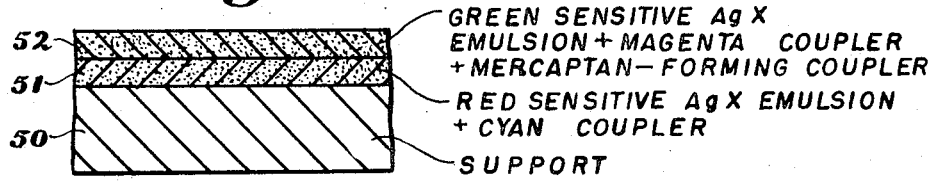

FIG. 5 of the drawings illustrates another light-sensitive element of the invention. On support 50 is coated red-sensitive silver halide emulsion layer 51 containing a cyan nondiffusible image-forming coupler. Over layer 51 is coated green-sensitive silver halide emulsion layer 52 containing a magenta nondiffusible image-forming coupler and a mercaptan-forming coupler that releases a diffusible development inhibitor on reaction with oxidized color developing agent. On color development with a color developing agent, the magenta dye formed in layer 52 is color corrected for unwanted red absorption of the magenta dye by a cyan mask formed in layer 51. On development of layer 52, oxidized color developing agent reacts with the mercaptan-forming coupler therein to release a diffusible development inhibitor which inhibits development in layer 51 as a function of the development taking place in layer 52.

FIG. 6 of the drawings illustrates another light-sensitive element of the invention. On support 60 is coated red-sensitive silver halide emulsion layer 61 containing a cyan nondiffusible image-forming coupler. Over layer 61 is coated layer 62 containing a mercaptan-forming coupler. Over layer 62 is coated green-sensitive silver halide emulsion layer 63 containing a magenta nondiffusible image-forming coupler. Over layer 63 is coated blue-sensitive silver halide emulsion layer 64 containing a yellow nondiffusible image-forming coupler. On color development, the mercaptan-forming coupler releases a diffusible development inhibitor which serves as a method for color correction in the photographic element as described in more detail below.

FIG. 7 of the drawings illustrates another typical light-sensitive element of the invention. On support 70 is coated fogged silver halide emulsion layer 71 containing a soluble dye-forming coupler. Over layer 71 is coated silver halide emulsion layer 72 containing a mercaptan-forming coupler that releases a diffusible development inhibitor when reacted with oxidized color developing agent. When this element is developed, the silver halide emulsion of layer 72 develops first and oxidized color developing agent reacts with the mercaptan-forming coupler to release a diffusible development inhibitor which diffuses imagewise to layer 71 inhibiting development in negative image areas. Fogged silver halide in areas corresponding to the positive image in layer 71 develops and oxidized color developing agent formed reacts with the soluble dye-forming coupler to release a soluble dye which thereafter diffuses imagewise to a mordanted reception layer or sheet (not shown) juxtaposed on layer 72. A light-sensitive element of this type is described in more detail in Example 1.

FIG. 8 of the drawings illustrates another typical light-sensitive element. On support 80 is coated green-sensitive silver halide emulsion layer 81 containing a yellow nondiffusible image-forming coupler. On layer 81 is coated red-sensitive silver halide emulsion layer 82 containing a cyan mercaptan-forming coupler that releases a diffusible development inhibitor on reaction with oxidized developing agent. Over layer 82 is coated green-sensitive silver halide emulsion layer 83 containing a nondiffusing image-forming magenta coupler. This light-sensitive element illustrates the use of the present mercaptan-forming couplers to give color correction. An element of this type is described in more detail in Example 4.

FIG. 9 of the drawings illustrates another typical light-sensitive multi-layer element of the invention employing the present mercaptan-forming couplers to effect color correction. On support 90 is coated red-sensitive silver halide emulsion layer 91 containing a cyan nondiffusible image-forming coupler. On layer 91 is coated green-sensitive silver halide emulsion layer 92 containing a mercaptan-forming coupler of the invention that releases a diffusible development inhibitor on reaction with oxidized color developing agent. On layer 92 is coated red-sensitive silver halide emulsion layer 93 containing a cyan nondiffusible image-forming coupler. Over layer 93 is coated interlayer 94 which is typically a hydrophilic colloid such as gelatin. Over layer 94 is coated green-sensitive silver halide emulsion layer 95 containing a magenta nondiffusible image-forming coupler. Over layer 95 is coated red-sensitive silver halide emulsion layer 96 containing a mercaptan-forming coupler of the invention that forms a diffusible development inhibitor on reaction with oxidized color developing agent. Over layer 96 is coated green-sensitive silver halide emulsion layer 97 containing a magenta nondiffusible image-forming coupler. Over layer 97 is coated yellow colloidal silver layer 98. Over layer 98 is coated blue-sensitive silver halide emulsion layer 99 containing a yellow nondiffusible image-forming coupler. The processing of such an element to effect color correction is described in Example 4.

FIG. 10 of the drawings illustrates another typical light-sensitive element of the invention in which the mercaptan-forming couplers are present together with the image coupler to impart a mutual development inhibiting effect upon an adjacent layer and thus produce color correction. On support 100 is coated green-sensitive silver halide emulsion layer 101 containing a magenta nondiffusible image-forming coupler and a magenta mercaptan-forming coupler of the invention that releases a diffusible development inhibitor and a magenta dye on reaction with oxidized color developing agent. Over layer 101 is coated interlayer 102 which is typically a hydrophilic colloid such as gelatin. Over layer 102 is coated red-sensitive silver halide emulsion layer 103 containing a cyan nondiffusible image-forming coupler. Over layer 103 is coated protective layer 104 which is typically a hydrophilic colloid such as gelatin. Example 5 describes the use of the present mercaptan-forming couplers in such an element to obtain color correction effects.

FIG. 11 of the drawings illustrates another light-sensitive element of the invention wherein the present mercaptan-forming couplers are utilized with a packet system to effect color correction of the image dyes. On support 110 is coated layer 111 comprising packets of a green-sensitive silver halide emulsion containing a mercaptan-forming coupler of the invention, and packets of a red-sensitive silver halide emulsion containing a mercaptan-forming coupler of the invention dispersed in blue-sensitive silver halide emulsion containing a yellow non-diffusible image-forming coupler. Over layer 111 is coated layer 112 comprising green-sensitive silver halide packets containing a mercaptan-forming coupler of the invention dispersed in a red-sensitive silver halide emulsion containing a cyan nondiffusible image-forming coupler. Over layer 112 is coated layer 113 comprising blue-sensitive silver halide emulsion packets containing a mercaptan-forming coupler of the invention and red-sensitive silver halide emulsion packets containing a mercaptan-forming coupler of the invention dispersed in green-sensitive silver halide emulsion containing a magenta nondiffusible image-forming coupler. This photographic element and its processing is described in more detail in Example 6.

FIG. 12 of the drawings illustrates another typical light-sensitive element of the invention wherein the present mercaptan-forming couplers are utilized to control the formation of masking images. On support 120 is coated fogged silver halide emulsion layer 121 containing magenta and yellow non-diffusible image-forming couplers. On layer 121 is coated red-sensitive silver halide emulsion layer 122 containing a cyan mercaptan-forming coupler of the invention that releases a diffusible development inhibitor and a cyan dye on reaction with oxidized color developing agent. Over layer 122 is coated barrier layer 123 which typically contains silver chloride which is used to control the diffusion of development inhibiting mercaptan compounds formed in the present element on development. Over layer 123 is coated fogged silver halide emulsion layer 124 containing cyan and yellow nondiffusible image-forming couplers. Over layer 124 is coated green-sensitive silver halide emulsion layer 125 containing a magenta mercaptan-forming coupler of the invention that forms a diffusible development inhibitor and a magenta dye on reaction with oxidized color developing agent. Over layer 125 is coated barrier layer 126 which is similar to layer 123 except that a yellow filter such as yellow colloidal silver is also present. Over layer 126 is coated fogged silver halide emulsion layer 127 containing a magenta nondiffusible image-forming coupler. Over layer 127 is coated blue-sensitive silver halide emulsion layer 128 containing a yellow mercaptan-forming coupler of the invention that forms a diffusible development inhibitor and a yellow dye on reaction with oxidized color developing agent. The element illustrated by FIG. 12 is described in more detail in Example 7.

FIG. 13 of the drawings illustrates a typical light-sensitive element of the invention that can be utilized in a one-step reversal color process. On support 130 is coated fogged silver halide emulsion layer 134 containing a magenta diffusible image-forming coupler. Over layer 134 is coated green-sensitive silver halide emulsion layer 131 containing a mercaptan-forming coupler of the invention that forms a diffusible development inhibitor on reaction with oxidized color developing agent. Over layer 131 is coated barrier layer 137 which typically contains a silver salt such as silver chloride, this layer preventing development inhibitors from wandering indiscriminately throughout the element. Over layer 137 is coated fogged silver halide emulsion layer 135 containing a cyan diffusible image-forming coupler. Over layer 135 is coated red-sensitive silver halide emulsion layer 132 containing a mercaptan-forming coupler of the invention which reacts with oxidized color developing agent to form a diffusible development inhibitor. Over layer 132 is coated barrier layer 138 which is similar to layer 137. Over layer 138 is coated fogged silver halide emulsion layer 136 containing a yellow diffusible image-forming coupler. Over layer 136 is coated blue-sensitive silver halide emulsion layer 133 containing a mercaptan-forming coupler of the invention which reacts with oxidized color developing agent to form a diffusible development inhibitor. Over layer 133 is coated protective layer 139 which is typically a gelatin layer.

This photoelement is described in more detail in Example 2.

FIG. 14 of the drawings illustrates another typical light-sensitive element of the invention wherein the subject mercaptan-forming couplers can be utilized to produce diffusible image dyes. On support 140 is coated red-sensitive silver halide emulsion layer 141 containing a non-diffusible mercaptan-forming coupler of the invention which forms a diffusible cyan dye and a nondiffusible mercaptan on reaction with oxidized color developing agent. Over layer 141 is coated interlayer 142 which is typically a gelatin layer. Over layer 142 is coated green-sensitive silver halide emulsion layer 143 containing a nondiffusible mercaptan-forming coupler of the invention which reacts with oxidized color developing agent to produce a diffusible magenta dye and a nondiffusible mercaptan. Over layer 143 is coated interlayer 144 which is typically a gelatin layer. Over layer 144 is coated blue-sensitive silver halide emulsion layer 145 which contains a nondiffusible mercaptan-forming coupler of the invention which reacts with oxidized color developing agent to form a diffusible yellow dye and a nondiffusible mercaptan. Over layer 145 is coated protective layer 146 which is typically a gelatin layer. This element is described in more detail in Example 13.

In the drawings, the term "AgX" refers to silver halide.

The following examples illustrate preferred embodiments of the invention.

EXAMPLE 1

Color transfer process using mercaptan-forming couplers

A photographic emulsion was prepared with the following materials:

| | |
|---|---|
| 1-phenyl-3-(3,5-disulfobenzamido) - 4 - (2-hydroxy-4-pentadecyl-phenyl-azo)-5-pyrazolone ___gram__ | 0.8 |
| Water _____cc__ | 40 |
| Sodium hydroxide 10% solution _____cc__ | 5 |
| Gelatin 10% solution _____cc__ | 100 |
| Saponin 7.5% solution _____cc__ | 16 |
| Alkanol B solution 5% _____cc__ | 8 |
| Gelatino-silver bromoiodide emulsion _____cc__ | 8 |

This emulsion was prepared by stirring the coupler in the water containing the sodium hydroxide and this solution poured into the gelatin solution followed by adjusting the pH to 6.8. The remaining ingredients were then added and the emulsion held at 40° C. for 30 minutes and coated on a cellulose acetate film support (e.g., layer 71, FIG. 7 of the drawings). Thereafter, samples of the coating were fogged by exposure for 30 seconds under a 40-watt bulb at a distance of 60 inches. Then twelve additional emulsions were prepared containing the following materials:

| | |
|---|---|
| Coupler [1] _____gram__ | .75 |
| 2,4-di-n-amylphenol _____cc__ | .75 |
| Dimethylformamide _____cc__ | .75 |
| Gelatin solution 10% _____cc__ | 18.75 |
| Alkanol B solution _____cc__ | 1.5 |
| Water _____cc__ | 7.5 |
| Saponin solution 7.5% aqueous _____cc__ | 1.5 |
| Gelatino-silver chlorobromide emulsion _____cc__ | 10 |

[1] The couplers used in preparing the eight emulsions were II, III, IV, V, X, XI, XII, XIII, XVI, CIX, CXI and XLIII.

These latter twelve emulsions were prepared by dissolving the coupler in the 2,4-diamylphenol by heating at 80° C., then adding the gelatin solution at 40° C., followed by the Alkanol B solution and milling five times in a colloid mill. The remaining ingredients were then added and the emulsion held for 30 minutes at 40° C. before coating upon the fogged emulsion layer described above (e.g., layer 72, FIG. 7 of the drawings). The resulting twelve two-layer films were then exposed under a step tablet and each treated with the following developer composition:

| | |
|---|---|
| Sodium hexametaphosphate _____gram__ | 0.2 |
| Benzyl alcohol _____cc__ | 1 |
| 3-acetamido-4-amino-N,N-diethyl-aniline ____gram__ | 0.2 |
| Sodium carbonate anhydrous _____do____ | 2 |
| Water to 100 cc. | |
| pH adjusted to 11. | |

Development of each sample was allowed to proceed while each emulsion was in contact with a reception sheet comprising a cellulose acetate film support having coated thereon a gelatin layer containing the mordant, cetyl trimethyl ammonium bromide, with the result that in each of the twelve examples the oxidized developing agent formed at the region of exposure coupled with the coupler in the emulsion thus releasing the corresponding mercaptan compound which diffused to the lower emulsion layer inhibiting development therein as a function of the exposure in the top layer. The residual uninhibited fogged silver halide then developed, the oxidized developer reacting with the coupler to form a diffusible dye in each sample which transferred to the mordanted receiving sheet forming a positive magenta image thereon.

EXAMPLE 2

Full color reversal transfer process using mercaptan-forming couplers

A sensitive element of the structure illustrated by FIG. 13 of the drawings was prepared with the following layers coated on a subbed cellulose acetate film support, reference being made to the layer numbers in FIG. 13:

Layer 134—the following emulsion containing 3% gelatin was coated over 3600 sq. ft. of support.

(1) A light fogged gelatino-silver chlorobromoiodide emulsion containing one mole of AgX,
(2) 8400 cc. of a 1.5% aqueous solution of coupler 1-phenyl-3-(3,5-disulfobenzamido) - 4 - (4-octadecyloxyphenylazo)-5-pyrazolone,
(3) 740 cc. of 7.5% saponin in water,
(4) 134 cc. of 2.7% mucochloric acid in water,
(5) water to make 22,100 g.

The resulting layer contained 30 mg. of silver/square foot, 35 mg. of coupler/square foot, and 184 mg. of gelatin/square foot.

Layer 131—the following emulsion was coated over 1740 sq. ft. of layer 134.

(1) A green-sensitized gelatin-silver chlorobromoiodide emulsion containing one mole of silver halide,
(2) A 1:1 ratio of coupler to coupler solvent dispersion of 159 g. of coupler II, 1-hydroxy-4-(2-nitrophenylthio) - N-[δ-(2,4-di-tert-amylphenoxy)butyl]-2-naphthamide, in 159 cc. of 2,4-di-n-amylphenol dispersed in an aqueous gelatin-Alkanol B solution,
(3) 400 cc. of 7.5% saponin,
(4) 73 cc. of 2.7% mucochloric acid, and
(5) water to make 12,000 g.

The resulting layer contained 62 mg. of silver/square foot, 91 mg. of coupler and coupler solvent/square foot, and 214 mg. of gelatin/square foot.

Layer 137—the following coated over 1080 sq. ft. of layer 131.

(1) A gelatino-silver chloride emulsion containing one mole of AgX,
(2) 216 cc. of 7.5% saponin,
(3) 43 cc. of 2.7% mucochloric acid, and
(4) water to make 6480 g.

The resulting layer contained 100 mg./square foot of silver and 200 mg./square foot of gelatin.

This layer, as in the case of layer 138 serves to prevent the excess development inhibiting substance released, the mercaptan, from wandering to adjacent emulsion layers and adversely affecting their development. It appears that in so doing the silver chloride absorbs the inhibitor compound such as 2-nitrothiophenol.

Layer 135—This layer had the composition of layer 134 except that the solution (2) of coupler was replaced by a solution of 315 g. of coupler 2-(3,5-disulfobenzamido)-5-methyl-4 - (4-octadecyloxyphenylazo)phenol di-potassium salt in 13,085 cc. of water. The coating contained 87 mg. of coupler/square foot.

Layer 132—This layer was coated in the manner of layer 131 except using one mole of red-sensitive gelatinochlorobromide emulsion instead of the green-sensitive emulsion.

Layer 138—This layer was coated in the manner of layer 137 except sufficient yellow colloidal silver dispersion to obtain 4.6 mg./square foot was included.

Layer 136—This coating was applied to layer 138 in the same manner as layer 135 except that the solution of coupler was replaced by an aqueous solution made by adding 315 g. of coupler 1-hydroxy-4-{4-{3-methyl-4-[3-(2,7-disulfo)naphthylazo] - 1 - pyrazolyl}phenylazo}-N-[δ-(3-pentadecylphenoxy)butyl] - 2 - naphthamide di-potassium salt in 10,000 cc. water and 1,000 cc. of 28% ammonium hydroxide solution to 5400 g. of 10% gelatin solution and neutralizing with citric acid to a pH of 7.

Layer 133—This layer was coated in the same manner as layer 131 except one mole of blue-sensitive gelatinochlorobromide emulsion was used.

Layer 139—This layer is a clear gelatin protective layer. The film constructed as described is exposed to a colored subject as in a camera or by contact or projection printing methods, then wetted with the following color developing composition:

Sodium carbonate des. _____ grams__ 20
Sodium hexametaphosphate _____ do____ 2.0
Benzyl alcohol _____ cc__ 10.0
3-acetamido-4-amino-N,N-diethylaniline __ grams__ 2.0
Water to 1 liter.
pH adjusted to 11.

The film is then squeegeed into contact with a receiving sheet of the type described in Example 1. Emulsion 131, 132, and 133 recording the green, red, and blue separation images of the subject then develop with the result that the oxidation product of this developing agent couples with Coupler II to form non-diffusing dye images in layers 131, 132, and 133 in the regions of exposure and split off the development inhibiting or mercapto-2-nitrophenylthio moiety in the same regions which diffuses imagewise to the adjacent fogged emulsions 134, 135, and 136, respectively, to locally inhibit development in the negative regions. In the positive regions of layers 134, 135, and 136 the silver halide develops and the dye-forming couplers therein couple with the oxidized developing agent. The coupler in layer 136 splits off a diffusible yellow azo dye from the coupler molecule and the couplers in layers 134 and 135 couple with the oxidized developer to form diffusible magenta and cyan dye, respectively. The magenta, cyan and yellow dyes then diffuse imagewise to the reeciving sheet and are mordanted therein to provide a positive color reproduction of the subjects. Additional prints can be obtained by at once squeegeeing fresh reception layers into contact with the moist film and transferring additional portions of the three dye images thereto.

EXAMPLE 3

Use of Mercaptan-Forming Couplers to Control the Contrast of Silver Images in Black-and-White Photography This example illustrates the development of silver images in the presence of the mercaptan-forming coupler compounds, the coupler in this case being present in the developer solution. A gelatino-silver bromoiodide emulsion was exposed for 10 seconds to a high-intensity lamp at 18 inches through a neutral density step tablet and processed as follows:

Development _____ minutes at 70° F__ 8
Rinse _____ seconds__ 30
Fix in hypo _____ minutes__ 5
Wash in water _____ do____ 10
Dry.

The following developer solutions were used:

Developer No. 1:
    Developing agent [1] _____ gram__ 1
    Sodium hexametaphosphate _____ do____ 0.2
    Benzyl alcohol _____ cc__ 1
    Sodium carbonate anhydrous _____ gram__ 1
    Coupler [2] _____ do____ 0.25
    Water _____ cc__ 100

Developer No. 2:
    Developing agent [1] _____ gram__ 1
    Sodium hexametaphosphate _____ do____ 0.2
    Benzyl alcohol _____ cc__ 1
    Sodium carbonate anhydrous _____ gram__ 1
    Coupler [3] _____ do____ 0.25
    Water _____ cc__ 100

Developer No. 3 (Control):
    Developing agent [1] _____ gram__ 1
    Sodium hexametaphosphate _____ do____ 0.2
    Benzyl alcohol _____ cc__ 1
    Sodium carbonate anhydrous _____ gram__ 1
    Coupler [4] _____ do____ 0.17
    Water _____ cc__ 100

[1] p-Amino-N-ethyl-N-β-hydroxyethylaniline sulfate.
[2] 1 - hydroxy-4-(1-phenyl-5-tetraboxylthio)-2-naphthoic acid CXV.
[3] 2 - (3,5 - disulfobenzamido)-5-methyl-4-(1-phenyl-5-tetrazolylthio)phenol dipotassium salt XXVII.
[4] 1-hydroxy-4-chloro-2-naphthoic acid.

The above developers were all adjusted to pH 11 with sodium hydroxide solution.

During development of the film the silver image was formed in each emulsion and each coupler reacted with the oxidized developing agent to form a soluble dye which washed out of the film. The couplers of developers 1 and 2 also yielded the development inhibiting compound phenylmercaptotetrazole. When the characteristic curves of the three films were plotted and compared, it was found that the contrast of the films developed with developers 1 and 2 were considerably lower than the contrast of the film developed with developer 3 as the development inhibiting substances released from the couplers in developers 1 and 2 caused a reduction in contrast illustrated by curve 3 of FIG. 2 in the drawings. In addition, the samples developed with developers 1 and 2 showed a considerable reduction in grain size of the developed silver obtained by the use of the inhibitor-releasing coupler.

EXAMPLE 4

Photographic Color Correction Using Interlayers Containing Mercaptan-Forming Coupler The well-known deficiencies of dyes obtained by color development in color films can be compensated for with the mercaptan-forming couplers of the invention that release development inhibitors in the manner of the following example where pairs of differently sensitized silver halide emulsions are developed in the presence of each other and an inhibitor-releasing coupler so that the development in one layer is controlled by the formation of development inhibiting substance in another layer.

Film A.—A photographic element of the type illustrated by FIG. 8 of the drawings was prepared. A green-sensitive gelatino-bromoiodide emulsion layer containing the following ingredients was coated on a cellulose acetate film support:

Mgs./sq. ft.
Silver (as silver halide) _____ 100
α-{4 - [α - (2,4-di-tert-amylphenoxy)acetamido]benzoyl}-2-methoxy acetanilide _____ 100
Di-n-butylphthalate _____ 50
Gelatin _____ 400

A red-sensitive gelatino-silver bromoiodide containing the following ingredients was coated over the green-sensitive layer:

| | Mgs./sq. ft. |
|---|---|
| Silver (as silver halide) | 100 |
| Coupler II | 100 |
| 2,4-di-n-amylphenol | 100 |
| Gelatin | 350 |

Over the red-sensitive layer was coated a green-sensitive gelatino-silver bromoiodide emulsion containing the following:

| | Mgs./sq. ft. |
|---|---|
| Silver (as silver halide) | 100 |
| 1-(2,4,6-trichlorophenyl)-3-[3-(2,4-di-tert-amylphenoxyacetamido)-benzamido]-5-pyrazolone | 100 |
| Tricresylphosphate | 50 |
| Gelatin | 350 |

Film B.—A second film was prepared in the same manner as Film A except that the following red-sensitive gelatino-silver bromoiodide emulsion was coated in lieu of that used in preparing Film A. The film did not contain the mercaptan-forming coupler as in the red-sensitive layer of Film A.

| | Mgs./sq. ft. |
|---|---|
| Silver (as silver halide) | 100 |
| 1-hydroxy-4-chloro-N-[$\delta$-(2,4-di-tert-amylphenoxy)-n-butyl]-2-naphthamide | 100 |
| 2,4-di-n-amylphenol | 100 |
| Gelatin | 350 |

Film A, prepared as described, appears substantially as shown in FIG. 8 wherein layer 80 is the support carrying the green-sensitive emulsion layer 81 containing the non-diffusing yellow dye forming coupler, the red-sensitive emulsion layer 82 containing the cyan dye forming inhibitor-releasing Coupler II and layer 83, the green-sensitive emulsion layer containing the magenta dye forming coupler. The Films A and B were each given a uniform exposure to green light and a red light exposure under a step tablet. Two other samples of the films were each given the same red light exposure as the other films, but no green light exposure. The four exposed film samples were then processed using the "Processing Steps for Eastman Color Negative Film, Type 5248" described by Hanson and Kisner in Society of Motion Picture and Television Engineers, volume 61, pages 667–701, December 1953, the processing steps being as follows:

| | | |
|---|---|---|
| (1) Prebath | sec | 10 |
| (2) Spray rinse | sec | 10–20 |
| (3) Color developer | min | 12 |
| (4) Spray rinse | sec | 10–20 |
| (5) First fixing bath | min | 4 |
| (6) Wash | min | 4 |
| (7) Bleach | min | 8 |
| (8) Wash | min | 8 |
| (9) Fix | min | 4 |
| (10) Wash | min | 8 |
| (11) Wetting agent | sec | 5–10 |
| (12) Dry | sec | 15–20 |

In the color development step the development of the green-sensitive emulsions commences accompanied by the formation of yellow and magenta dyes respectively in layers 81 and 83. However, the red emulsion layer 82 is also undergoing development and the development-inhibiting substance 2-nitrothiophenol is being split off of the Coupler II molecule to inhibit the development of both layer 81 and 83 in proportion to red light step tablet exposure of layer 82. When the green light absorption curves of the magenta images obtained from Films A and B were compared, it was found that both couplers used in layer 82 inhibited development of the magenta image in layer 83 to some extent, but that in Film B seven times as much silver was developed as in Film A because of the pronounced restraining effect on development of the coupler of Film A. One result was that the magenta dye development in layer 83 was decreased in proportion to the exposure and development in the cyan layer 82, thus showing how the cyan image can be used to decrease development of a magenta image in a color film. Color correction can be introduced into a multicolor film in the same manner by situating mercaptan-forming couplers of the invention that release development inhibitors when reacted with oxidized color developing agent in the interlayers between the differently sensitized layers of a color film constructed as illustrated by FIG. 9 of the drawings wherein layers 91 and 93 are gelatino-silver halide emulsions sensitive to red light, each containing a non-diffusing cyan forming coupler and separated by green-sensitive emulsion layer 92 containing inhibitor-releasing Coupler XLIII. Red-sensitive silver halide layer contains inhibitor-releasing Coupler II. Green-sensitive emulsion layers 95 and 97 each contain non-diffusing magenta forming couplers. Layer 98 is a filter layer such as yellow colloidal silver. The top layer 99 is a blue-sensitive AgX emulsion containing a non-diffusing yellow dye-forming coupler. Upon color development of the film of FIG. 9 in the manner described above, the inhibitor-releasing substances produced in layers 92 and 96 inhibit the development of the adjacent red- and green-sensitive emulsions, thus decreasing the amount of cyan and magenta dyes formed in proportion to the exposure of the layers containing the inhibitor-releasing coupler compounds.

EXAMPLE 5

Photographic color correction using emulsion layers containing mercaptan-forming couplers A film support was provided with emulsion layers in the manner illustrated by FIG. 10 as follows:

Film A.—Layer 101 is a red-sensitive gelatino-silver bromoiodide emulsion layer containing:

| | Mgs./sq. ft. |
|---|---|
| Silver (as silver halide) | 300 |
| 1 - hydroxy - 2 - [$\delta$-(2,4-di-tert-amylphenoxy)-n-butyl]naphthamide | 50 |
| Gelatin | 500 |

Layers 102 and 104 contain 80 mgs. of gelatin/sq. ft. Layer 103 is a green-sensitive gelatino-silver bromoiodide emulsion layer containing:

| | Mgs./sq. ft. |
|---|---|
| Silver (as silver halide) | 150 |
| 1 - (2,4,6 - trichlorophenyl) - 3{3-[$\delta$-(2,4-di-tert-amylphenoxy) acetamido]-benzamido}-5-pyrazolone | 50 |

Film B.—Film B was prepared the same as Film A but layer 101 also had 20 mgs./sq. ft. of the Coupler XI (containing the tetrazolylthio development inhibiting moiety).

Film C.—Layer 101 contained a green-sensitive gelatino-silver bromoiodide emulsion and magenta coupler 1 - (2,4,6 - trichlorophenyl) - 3{3-[$\delta$-(2,4-di-tert-amylphenoxy)acetamido]benzamido}-5 - pyrazolone. Layers 102 and 104 were the same as in Film A. Layer 103 contained a red-sensitive gelatino-silver bromoiodide emulsion and the cyan coupler of layer 101 of Film A.

Film D.—Film D was the same as Film C except layer 101 also had 20 mgs./sq. ft. of Coupler XLIII (containing the tetrazolylthio development inhibiting moiety) as well as the magenta image coupler. Films A and B were given red light exposures under a step tablet and each uniformly flashed to green light then color developed in the Type 5248 process referred to in Example 4. Upon comparison of the developed films it was found that the development of the magenta dye in layer 101 of Film B had decreased in proportion to the exposure and development in the underlying cyan layer and thus in proportion to the amount of development-inhibiting compound released from Coupler XI. Improved image sharpness was particularly evident. Films C and D were given green light step tablet exposures and flashed to red light then color developed in the Type 5248 process of Example 4 with the result that the development-inhibiting compound released in layer 101 of Film D decreased the development of the cyan image in layer 103. Also, a pronounced improvement in image sharpness was observed. The improvement obtainable in image sharpness is conveniently demonstrated by preparing single layer coatings containing, e.g., 50 mgs./sq. ft. of the cyan coupler of layer 101 of Film A and 5.0 mgs./sq. ft. of Coupler XI, or 50 mgs./sq. ft. of the magenta coupler of layer 101 of Film C plus 5.0 mgs./sq. ft. of Coupler XLIII. Color development of the coatings results in gain in the contrast and density of the fine detail of subjects which enhances picture sharpness and overcomes losses often suffered as a result of light-scattering.

EXAMPLE 6

Color correction of multilayer packet film using mercaptan-forming couplers

A film was prepared as described below, having the structure illustrated by FIG. 11 of the drawings, wherein layer 111 is a blue-sensitive gelatino-silver bromoiodide emulsion layer containing the non-diffusing yellow image-forming coupler, α-benzoyl - 4 - [N-(p-tolyl)-N-(γ-phenylpropyl)sulfamyl]acetanilide, and packets of red- and green-sensitive gelatino-silver bromoiodide emulsions, each containing a mercaptan-forming coupler prepared as follows:

(A) Blue-sensitive emulsion (layer 111)

Magenta DIR coupler dispersion.—50 grams of Coupler XLIII (magenta dye-forming mercaptan-forming coupler) are dissolved in warm (40° C.) ethyl acetate. This solution is mixed with 500 ml. of 10% phthaloylated gelatin, containing 30 ml. of 5% Alkanol B, all at 40° C., then dispersed by passing through a colloid mill. The dispersion is then set on a chill plate, noodled, and air-dried to constant weight.

Coupler solvent dispersion.—20 grams of 2,4-di-n-amyl-phenol are mixed with a solution of 75 ml. of 20% phthaloylated gelatin and 5 ml. of 10% Alkanol B at 40° C. The mixture is then dispersed in a colloid mill.

Packet preparation (green-sensitive).—1.45 grams of the dried coupler dispersion containing 0.71 g. of Coupler XLIII (magenta dye-forming development inhibitor-releasing coupler) is soaked in 8 ml. of 2½% sodium citrate solution for about 30 minutes, then dispersed by heating to 40° C., and stirring. To this is added 17.5 grams of 20% phthaloylated gelatin and the mixture stirred for about 5 minutes. 2.8 ml. of 5% styrene-maleamic polymer solution is added, followed one minute later by 25.9 grams (0.01 M) of melted green-sensitive gelatino-silver chlorobromide emulsion. The packets, which form during continued stirring at 40° C., are hardened after 10 minutes with 3 ml. of 10% calcium acetate solution. The system, which is now stabilized, can be set and held in the refrigerator until ready for coating. Following the procedure of U.S. Patent 2,784,544, the 2,4-di-n-amyl-phenol dispersion is added, at the time of coating, in an amount such that about twice the weight of the Coupler XLIII is contained in the coating mixture.

Packet preparation (red-sensitive).—In a similar manner as described for the preparation of green-sensitive packets, packets of a red-sensitive gelatino-silver bromoiodide emulsion are prepared containing Coupler II (cyan dye-forming development inhibitor-releasing coupler). The emulsion for coating layer 111 is prepared by adding the desired amount and proportions of the above green- and red-sensitive packets to the fast blue-sensitive gelatino-silver bromoiodide emulsion containing the yellow image-forming coupler mentioned above. The amounts of the packets used are determined in part by the extent and type of color correction desired. The methods of Godowsky U.S. Patents 2,698,794 and 2,843,489 can also be used in preparing the polymeric packets.

(B) Red-sensitive emulsion (layer 112)

In the manner described above for preparing layer 111, green-sensitive gelatino-silver chlorobromide emulsion packets containing the magenta dye-forming development inhibitor-releasing coupler, Coupler XLIII, are prepared and added to a red-sensitive gelatino-silver chlorobromide emulsion containing the non-diffusing cyan image coupler, 1 - hydroxy - N - [δ - (2,4 - di-tert-amylphenoxy)butyl]-2-naphthamide, and the emulsion coated as layer 112.

(C) Green-sensitive emulsion (layer 113)

In the manner described above for preparing layer 111, packets of red-sensitive gelatino-silver chlorobromide and blue-sensitive gelatino-silver bromoiodide emulsions containing the cyan dye-forming development inhibitor-releasing coupler, Coupler II, and yellow dye-forming development inhibitor-releasing coupler, Coupler LXIV, respectively are prepared and added in the quantity and proportion required to a green-sensitive gelatino-silver chlorobromide emulsion containing the non-diffusing magenta dye-forming coupler 1 - (2,4,6 - trichlorophenyl)-3-{3 - [α-(2,4-di-tert-amylphenoxy)acetamido] benzamido}-5-pyrazolone, and the resultant emulsion coated as layer 113 of the element illustrated by FIG. 11 of the drawings. The element prepared as described can be exposed in the usual way to a colored subject and developed with the color developer solution described in Example 2. As a result, yellow, cyan and magenta dye images are obtained in layers 111, 112, and 113 respectively. The character of these dye images is determined by the amount of exposure of the sensitive packets present in each emulsion layer and the development inhibiting substance formed. Thus, in layer 113 the inhibitors formed from the mercaptan-forming couplers in the red- and blue-sensitive packets respectively decrease the amount of magenta dye image formed thus subtracting green density and correcting for the unwanted green absorption of the cyan dye image in layer 112 and the unwanted green absorption of the yellow dye image in layer 111. Similar effecsts are obtained in layers 111 and 112, the development-inhibiting substances formed therein effecting corrections for the image dyes in the other layers. It will be apparent from the above description that the inhibitor-releasing couplers, such as Coupler II, react with the oxidized silver halide developing agent to form non-diffusing dye as well as splitting off a development inhibiting substance. Consequently, a coupler can be chosen so that the dyes obtained therefrom are identical to and supplement the dyes obtained from the image-forming couplers of the system. Thus, Coupler II forms a cyan dye which not only supplements but is identical to that formed from the non-diffusing image-forming cyan coupler mentioned above. The same is true for the yellow dye-forming mercaptan-forming coupler, Coupler LXIV, and the non-diffusing image-forming yellow coupler mentioned above. Coupler XLIII forms a magenta dye which supplements but is not identical to the dye from the non-diffusing image-forming magenta coupler mentioned above.

EXAMPLE 7

Color Correction Using Mercaptan-Forming Couplers

A multilayer color film was prepared having the structure illustrated by FIG. 12 of the drawings in the following manner: On the cellulose acetate film support was coated a fogged gelatino-silver bromoiodide emulsion (layer 121) containing a mixture of the magenta dye-forming coupler, 1-(2,4,6 - trichlorophenyl) - 3 - {3 - [α - (2,4 - di-tert-amylphenoxyacetamido]-benzamido} - 5 - pyrazolone, and the yellow dye-forming coupler α - benzoyl - 4 - [N-(p-tolyl) - N - (γ-phenylpropyl)sulfamyl]-acetanilide. Over layer 121 was coated emulsion layer 122 containing a red-sensitive gelatino-silver bromoiodide emulsion and the cyan dye-forming inhibitor-releasing coupler, Coupler XI. On layer 122 was coated barrier layer 123 composed of gelatino-silver chloride in order to control the diffusion of the development-inhibiting substance formed in layer 122 on development. A fogged gelatino-silver bromoiodide emulsion (layer 124) containing a mixture of the colorless cyan and yellow dye-forming couplers, 1-hydroxy-N-[δ - (2,4 - di - tert - amylphenoxy)-n-butyl]-2-naphthamide and the yellow dye-forming coupler used in layer 121 was coated over layer 123. A green-sensitive gelatino-silver bromoiodide emulsion (layer 125) containing the magenta dye-forming inhibitor-releasing coupler, Coupler XLIII, was coated over layer 124. On layer 125 was coated a gelatino-silver chloride barrier layer (layer 126) containing a yellow filter material such as yellow colloidal silver followed by a fogged gelatino-silver bromoiodide emulsion layer (layer 127) containing the colorless magenta dye-forming coupler in layer 121. Upon layer 127 was coated a blue-sensitive gelatino-silver bromoiodide emulsion layer (layer 128) containing the yellow dye-forming inhibitor-releasing coupler, Coupler LXIV. Upon color development of the multilayer film described, negative dye images are formed in the emulsion layers 122, 125, and 128 and the development-inhibiting substance formed at the same time in the development of these layers diffused to the underlying fogged silver halide emulsion layers and controlled the development therein of masking images in the positive regions. Thus, in the positive region of layer 121, a masking image composed of a mixture of magenta and yellow dyes was obtained, in the positive region of layer 124, a mixture of cyan and yellow dyes was obtained and in the positive region of layer 127, a masking image composed of magenta dye was obtained. As a result, the positive masking images obtained in layers 121, 124, and 127 serve to impart full color correction to the negative images in emulsion layers 122, 125, and 128. It will be noted that the film prepared as described and illustrated by FIG. 12 of the drawings contains substantially colorless couplers which is advantageous since conventional colored couplers tend to interfere with the exposure of such films. In preparing a film of the structure described, it may be desirable for some purposes to supplement the cyan, magenta, and yellow dye-forming ihibitor-releasing couplers in layers 122, 125, and 128 by conventional non-difusing cyan, magenta, and yellow dye-forming couplers. As a result, the dye images formed in layers 122, 125, and 128 will be composed of a mixture of dyes. Thus, in emulsion layer 122 would be formed a cyan negative dye image composed of cyan dyes formed from both the cyan inhibitor-releasing coupler and the supplementary non-diffusing cyan coupler.

EXAMPLE 8

Use of the Present Coupler in Developer To Reduce Contrast and Grain Size of Emulsion A gelatino-silver bromoiodide emulsion coated on a cellulose acetate film support was exposed, developed in the following developers, rinsed, fixed in hypo, washed in water and dried.

Developer 1:
    4-amino-N-ethyl - N - (β - hydroxyethyl) aniline _____grams___ 2.0
    Sodium hexametaphosphate _____do____ 0.4
    Benzyl alcohol _____cc___ 2.0
    Sodium carbonate (des.) _____grams___ 2.0
    1 - hydroxy - 4 - chloro-N-[β-(3-sulfo benzamido)ethyl]-2-naphthamide _____grams___ 0.3
    Water to 200 cc.
    pH adjusted to 11 with dilute NaOH solution.

Developer 2.—Same as developer 1 but 0.3 gram of Coupler XIX was added. The second developer produced a lower contrast image, and due to release of the tetrazolylthio development inhibiting moiety from Coupler XIX, a considerable reduction in grain size resulted.

EXAMPLE 9

Use of Couplers in Emulsion to Reduce Grain Size

Four gelatino-silver bromoiodide emulsions were prepared containing the following ingredients:

Coupler [1] _____gram__ 1.0
2,4-di-n-amylphenol _____cc__ 1.0
Dimethyl formamide _____cc__ 1.0
Gelatin (10% solution) _____cc__ 10.0
Alkanol B (5% solution) _____cc__ 4.0
Water _____cc__ 5.0
Silver bromoiodide emulsion _____cc__ 30.0

[1] One of four Couplers II, X, XI, and the check coupler, 1-hydroxy - 4 - chloro-N-[δ-(2,4-di-tert-amylphenoxy)-butyl]-2-naphthamide, that latter coupler not being the type that releases a development inhibiting moiety on color development. Each emulsion was coated on a subbed cellulose acetate film base, exposed and developed in developers 1 and 2 below.

Developer 1:
    Water _____cc__ 500
    Monomethyl-p-aminophenol sulfate _____grams__ 2
    Sodium sulfite _____do____ 90
    Hydroquinone _____do____ 8
    Sodium carbonate·water _____do____ 52.5
    Potassium bromide _____do____ 5.0
    Water to 1 liter.

Developer 2:
    4-amino-N-ethyl-N-(β-hydroxyethyl)aniline _grams__ 2
    Sodium hexametaphosphate _____do____ 0.4
    Sodium carbonate (des.) _____do____ 2
    Water to 200 cc.

The grain and contrast of the four emulsions developed in black-and-white developer 1 were identical, but with color developer 2, the emulsions containing II, X, and XI had considerably reduced grain size compared to the emulsion containing the check coupler.

EXAMPLE 10

Use of Inhibitor-Releasing Couplers To Obtain a Full-Color Reproduction in a One-Step Reversal Process Example 2 was repeated except using Couplers LXXII in layer 135 and XXCVI in layer 136 for the cyan and yellow image-forming couplers respectively. Upon processing as described in Example 2, a full-color print on the receiving sheet resulted.

EXAMPLE 11

Example 1 was repeated except a mixture of zinc sulfide physical development nuclei and silver thiocyanate was added to the emulsion for layer 71 and the light-fogging step was omitted. Samples carrying layer 71 were overcoated with the eight emulsions as described in Example 1, respectively, and upon exposure and development of each in contact with the mordanted receiving sheets, dye images were transferred to the receiving sheets.

EXAMPLE 12

Example 1 was repeated except adding zinc sulfide physical development nuclei to the emulsion for layer 71 and the light-fogging step was omitted. Samples carrying layer 71 were overcoated with the eight emulsions as described in Example 1, respectively, and after exposure, and development of each with the developer composition of Example 1, to which had been added sodium thiocyanate, in contact with the mordanted receiving sheets, dye images transferred to the receiving sheets.

EXAMPLE 13

Use of the Present Couplers as Diffusible Dye-Forming Couplers in Diffusion Transfer Processes Multilayer photographic elements suitable for use in preparing three-color diffusion transfer images of the type illustrated by FIG. 14 were prepared by coating on subbed cellulose acetate film supports the following layers numbered in sequence from the support:

(1) An emulsion optically sensitized to red light containing silver bromoiodide at a coverage of 135 mg. of silver/square foot, gelatin at a coverage of 250 mg./square foot, cyan-forming coupler CXIII at a coverage of 55 mg./square foot, and 2,5-dihydroxy-4-octadecyl-benzene sulfonic acid potassium salt at a coverage of 4.5 mg./square foot;

(2) Gelatin at a coverage of 100 mg./square foot, 1-hydroxy - N - [δ - (2,4-di-t-amylphenoxy)butyl]-2-naphthamide at a coverage of 45 mg./square foot, and 1-hydroxy-4'-(4-t-butylphenoxy) - 4 - phenylazo - 2 - naphthanilide at a coverage of 15 mg./square foot;

(3) An emulsion optically sensitized to green light containing silver bromoiodide at a coverage of 80 mg. of silver/square foot, gelatin at a coverage of 113 mg./square foot, magenta-forming coupler LXXIII at a coverage of 50 mg./square foot, and 2,5-dihydroxy-4-octadecyl-benzene sulfonic acid potassium salt at a coverage of 4.4 mg./square foot;

(4) Gelatin at a coverage of 100 mg./square foot, Carey Lea silver at a coverage of 15 mg./square foot, and 1-hydroxy-N-[δ-(2,4-di-t-amylphenoxy)butyl] - 2-naphthamide at a coverage of 45 mg./square foot;

(5) An emulsion optically sensitized to blue light containing silver bromoiodide at a coverage of 100 mg. of silver/square foot, gelatin at a coverage of 100 mg./square foot, yellow-forming coupler XXCVI at a coverage of 100 mg./square foot, and 2,5-dihydroxy-4-octadecyl-benzene sulfonic acid potassium salt at a coverage of 3.3 mg./square foot; and (6) A gelatin overcoat at a coverage of 50 mg./square foot.

The silver bromoiodide utilized in layers 1, 3, and 5 was of the internal image type having high internal sensitivity and low surface sensitivity and prepared by the procedure described in Davey et al., U.S. Patent 2,592,250, issued Apr. 8, 1952. Conventional couplers that form non-diffusible dyes on color development were utilized in layers 2 and 4 to prevent wandering of oxidized color developing agent between the light sensitive layers. The prepared photographic elements were then exposed for 1/10 second with a 500 watt positive lamp and a 4.08 Corning filter in an Eastman Type IB intensity scale sensitometer and developed in Color Developer F below.

Color Developer F:
Piperidino hexose reductone _____grams__ 0.80
6-nitrobenzimidazole _____do____ 0.05
Sodium hydroxide _____do____ 16.0
4 - amino - N - ethyl - N - (β - hydroxyethyl)-
aniline _____grams__ 20.0
Water to make 1 liter.

The processing of the multilayer photographic elements was carried out by immersing for 20 seconds at 68° F. the elements and photographic image receiving sheets containing the cationic mordant, dimethyl-β-hydroxyethyl-α-(octadecylamido)-propyl ammonium dihydrogen phosphate, bringing the photographic elements and receiving sheets in intimate contact for 5 minutes, and then separating the photographic element and the receiving sheet to produce a positive full-color image on the receiving sheet.

The mercaptan-forming couplers of the invention can also be used for obtaining a direct reversal color reproduction in a multilayer element having a structure similar to that shown in FIG. 12. A film is prepared having red, green, and blue light-sensitive gelatino-silver halide emulsions 122, 125, and 128 and underlying fogged silver halide emulsions 121, 124, and 127 containing non-diffusing image-forming couplers for forming non-diffusible cyan, magenta, and yellow dye images. Barrier layers 123 and 126 of unsensitized silver halide can be used as shown in FIG. 12. After exposure to a subject the element is developed in developer No. 1 in Example 3 containing Coupler CXV. The exposed silver halide in each emulsion develops splitting off the mercaptotetrazole compound from Coupler CXV in the region of development in layers 122, 125, and 128 which diffuses to the adjacent, fogged emulsion layers locally inhibiting their development. In the uninhibited regions of the fogged emulsions the developer develops the fogged silver halide and the oxidation product of the developing agent reacts with the image-forming couplers to form non-diffusing positive dye images. The film is then fixed and bleached to remove silver and residual silver halide and washed in the usual manner.

In a similar manner, in a packet film, red, green, and blue sensitive gelatino-silver halide emulsions are provided each containing a polymeric packet containing fogged silver halide and a non-diffusing cyan, magenta, or yellow dye-forming coupler. The emulsions are coated in the natural order with unsensitized gelatino silver chloride interlayers. Development as described above using the developer containing a mercaptan-forming coupler yields a positive three-color print in the same manner, the development inhibitor released locally from the packets inhibiting dye image formation in the negative regions and subtractively colored dye images forming in the positive region of the emulsion layers.

In the above direct reversal color process the negative emulsions should have a shorter development induction period than the fogged silver halide emulsions, and the image-forming couplers should have higher coupling rates than the mercaptan-forming couplers.

EXAMPLE 14

While the mercaptan-forming couplers used in the photographic elements and developers of the invention all react with oxidized color developing agents to form mercaptans (e.g., R—SH), thioether compounds having two coupling moieties attached to the monothio moiety of the present couplers do not form mercaptans when reacted with oxidized color developing agents. These latter compounds can be represented by the formula
COUP—S—COUP, as distinguished from our coupler compounds which can be represented by the formula

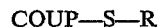

COUP—S—R described in detail above. These two types of coupler compounds were compared as development inhibitor-releasing couplers in a diffusion transfer process utilizing a photographic element of the general type illustrated by FIG. 7 of the drawings and described in Example 1. The couplers being compared were employed in layer 72 in equimolar proportions. When the "COUP—S—COUP" coupler, thiobis[1-phenyl - 3 - methyl-5-pyrazolone] as described in Gluck, U.S. Pat. 2,387,145, was utilized, no reversal transfer image was obtained. The image transferred to the receiving sheet substantially uniformly from both the exposed and unexposed areas of the negative. However, as described in Example 1, a positive dye image is formed on the receiving sheet when the "COUP—S—R" coupler of the invention was utilized.

The following syntheses illustrate the methods for preparations of representative thioether couplers of our invention.

(II) 1- hydroxy-4-(2-nitrophenylthio)-N-[δ-(2,4 - di-tert-amyl-penoxy)butyl]-2-naphthamide

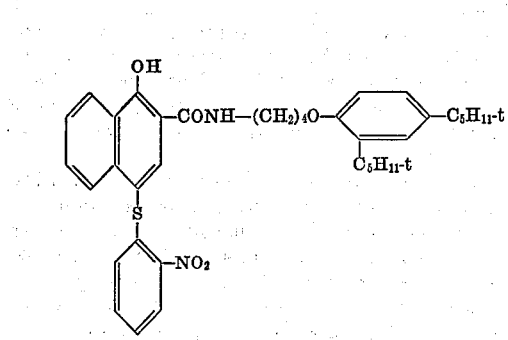

To a solution of 47.5 g. of 1-hydroxy-N-[α-(2,4-di-tert-amyl-phenoxy)butyl]-2-naphthamide (U.S. Pat. 2,474,293) in 1000 ml. of toluene was added over a period of 20 minutes a solution of 19 g. of o-nitrophenylsulfur chloride in 250 ml. of toluene. This solution was refluxed for 25 hours and concentrated in vacuo. The solid residue was recrystallized from 500 ml. of cyclohexane, yielding 30 g. of yellow product which melted at 112–113° C.

(III) 1 - hydroxy-4-(4-nitrophenylthio)-N-[δ-(2,4-tert-amyl-phenoxy)butyl]-2-naphthamide.—To a solution of 47.5 g. of 1-hydroxy-N-[δ-(2,4-di-tert-amyl-phenoxy)butyl]-2-naphthamide in 750 ml. of diethyl ether was added over a period of 20 minutes, with stirring at 5° C., a solution of 19 g. of p-nitrophenylsulfur chloride (J.A.C.S., 56, 1978 (1934)) in 200 ml. of chloroform. The clear solution was refluxed for 6 hours and concentrated in vacuo. The solid residue was recrystallized from 1500 ml. of acetonitrile, yielding 40 g. of product, M.P. 156–157° C.

(IV) 1 - hydroxy-4-(2-aminophenylthio)-N-[δ-(2,4-di-tert-amyl-phenoxy)butyl]-2-naphthamide.—A solution of 12.6 g. of 1-hydroxy-4-(4-nitrophenylthio)-N-[δ-(2,4-di-tert-amylphenoxy)butyl]-2-naphthamide (II) in 200 ml. of dioxane was reduced at 50 p.s.i. hydrogen pressure and 60° C. on the Parr hydrogenation apparatus using palladium on charcoal as a catalyst. The product was isolated by concentrating the filtered reduction solution in vcuo; M.P. 106–107° C.

(V) 1 - hydroxy-4-(4-aminophenylthio)-N-[δ-(2,4-di-tert-amyl-phenoxy)butyl]-2-naphthamide.—A solution of 12.6 g. of 1-hydroxy-4-(4-nitrophenylthio)-N-[δ-(2,4-di-tert-amylphenoxy)butyl]-2-naphthamide (III) in 200 ml. of dioxane was reduced on the Parr hydrogenation apparatus at 50 p.s.i. hydrogen pressure and 60° C. using palladium on charcoal as a catalyst. The product was isolated by drowning the filtered reduction solution in 1000 ml. of water; M.P. 119–120° C.

(IX) 1-hydroxy-4-(4-methylsulfonamidophenylthio)-N-[δ - (2,4-di-tert-amplphenoxy)butyl]-2-naphthamide.—To a solution of 6 g. of 1-hydroxy-4-(4-aminophenylthio)-N-[δ-(2,4-di-tert-amylpehnoxy)butyl] - 2 - naphthamide (V) and 2.6 g. of quinoline in 150 ml. of dioxane was added with stirring at 25° C., 1.15 g. of methane sulfonyl chloride. The clear reaction mixture was left at room temperature overnight. It was poured into 1000 ml. of 5% hydrochloric acid and the solid product was filtered and dried; M.P. 129–130° C.

(X) 1 - hydroxy-4-(2-benzothiazolylthio)-N-[δ-(2,4-di-tert-amylphenoxy)butyl]-2-naphthamide.—To a solution of 47.5 g. of 1-hydroxy-N-[δ-(2,4-di-tert-amyl-phenoxy)butyl]-2-naphthamide in 300 ml. of carbon tetrachloride was added at the reflux a solution of 20 g. of 2-benzothiazolyl-sulfur chloride (U.S. Pat. 2,257,974) in 300 ml. of hot carbon tetrachloride. This solution was refluxed overnight and concentrated in vacuo. The solid residue was recrystallized from 250 ml. of ethanol, yielding 43 g. of product which melted at 148–149° C.

(XI) 1-hydroxy-4-(1-phenyl - 5 - tetrazolylthio) - N-[δ-(2,4-di-tert-amylphenoxy)butyl]-2-naphthamide

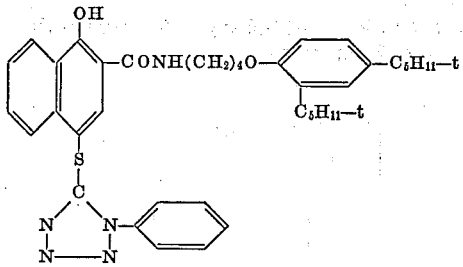

To a solution of 47.6 g. of 1-hydroxy-N-[δ(2,4-di-tert-amyl-phenoxy)butyl]-2-naphthamide in 500 ml. of carbon tetrachloride was added a solution of 21 g. of 1-phenyl-5-tetrazolylsulfur chloride, Org. Syn. Coll. vol. II, p. 445, in 200 ml. of carbon tetrachloride. The mixture was refluxed overnight and concentrated in vacuo. The solid was recrystallized from 500 ml. of acetonitrile, yielding 50 g. of product which melted at 147–148° C.

(XII) 1-hydroxy-4-(2-benzothiazolylthio) - N - octadecyl-3',5'-dicarboxy-2-naphthanilide

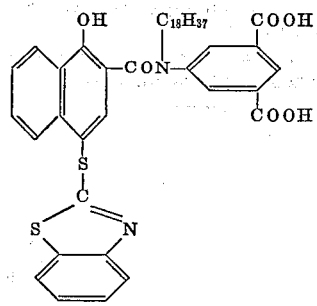

To a solution of 60 g. of 1-hydroxy-N-octadecyl-3',5'-dicarboxy-2-naphthanilide in 100 ml. of dioxane and 500 ml. of carbon tetrachloride was added at the reflux a solution of 20 g. of 2-benzothiazolylsulfur chloride in 100 ml. of carbon tetrachloride. This solution was refluxed overnight. It was concentrated in vacuo. The solid residue was slurried in 1000 ml. of methanol, filtered and the filtrate concentrated again in vacuo. The residue was recrystallized from a mixture of 500 ml. of acetic acid and 500 ml. of acetonitrile, yielding 40 g. of product, M.P. 182–183° C.

(XIII) 2-(3,5 - dichlorosulfonyl - N - octadecylbenzamido)-5-methyl-4-(4-nitrophenylthio)phenol

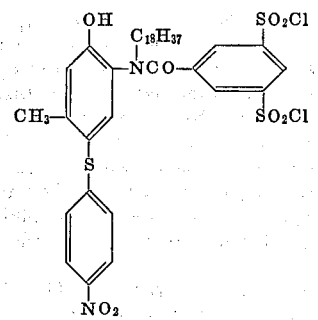

To a solution of 42 g. of 2-(3,5-dichlorosulfonyl-N-octadecylbenzamido)-5-methylphenol in 3000 ml. of diethyl ether was added a solution of 20 g. of p-nitrophenylsulfur chloride in 200 ml. of chloroform. The mixture was refluxed overnight and concentrated in vacuo. The residual solid was collected and air dried; M.P. 196–198° C.

(XIV) 1-hydroxy-4-(2 - nitrophenylthio) - N - octadecyl-3',5'-dicarboxy-2-naphthanilide.—A mixture of 6 g. of 1-hydroxy-N-octadecyl-3',5'-dicarboxy-2-naphthanilide and 1.9 g. of 2-nitrophenylsulfur chloride in 50 ml. of acetic acid containing 8 g. of sodium acetate was refluxed for 2 hours. The mixture was then concentrated to dryness and the residue was stirred with ligroin and recrystallized from acetic acid, yielding 4 g. of product, M.P. 173–174° C.

(XVI) 1-hydroxy-4-(1-phenyl - 5 - tetrazolylthio)-2'-tetradecyloxy-2-naphthanilide

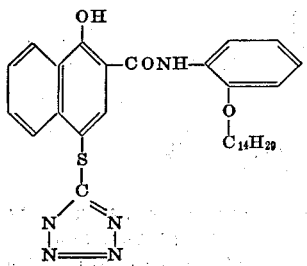

Into a solution of 1.6 g. of 1-phenyl-5-mercaptotetrazole in 100 ml. of acetonitrile, chlorine gas was bubbled for one hour. The excess chlorine gas was removed at room temperature by means of reduced pressure. This solution was added to a solution of 4.1 g. of 1-hydroxy-2'-tetradecyloxy-2-naphthanilide in 300 ml. of acetonitrile at 50° C. This solution was stirred at room temperature for 15 hours. The solid which separated was filtered off and dried; M.P. 99–100° C.

(XLIII) 1-[4-(4-tert-butylphenoxy)phenyl] - 3 - [α-(4-tert-butyl-phenoxy)propionamido]-4 - (1 - phenyl - 5 - tetrazolylthio)-5-pyrazolone ture. The mixture was stirred at room temperature for 1½ hours and then heated on a steam bath for 30 minutes. It was concentrated to an amber glass. 300 ml. absolute ethanol was added and the product solidified. The slurry was heated to reflux and stirred vigorously. The solid which separated was collected and recrystallized from 300 ml. of glacial acetic acid, followed by a second recrystallization from 250 ml. of acetonitrile, yielding 10 g. of product; M.P. 154–155° C.

(LXIV) α - Benzoyl - α - (4 - nitrophenylthio)-4-[N-(γ - phenylpropyl) - N - (p-tolyl)sulfamyl]acetanilide.—13.5 g. of the 4,4'-dinitrodiphenyldisulfide was suspended in 300 ml. of dry carbon tetrachloride. The mixture was stirred and cooled to 5–10° C. and chlorine gas was slowly passed through the mixture. After 45 minutes the chlorine was stopped and the temperature was raised to 30° C. and held for an additional 30 minutes. The small amount of insoluble material was filtered off and the filtrate was concentrated to an orange oil under aspirator pressure. This was taken up in 100 ml. dry dioxane. One half of the above solution was added to a solution of 15.8 g. α-benzoyl-4-[N-(γ-phenylpropyl)-N-(p-tolyl)sulfamyl]acetanilide in 150 ml. dioxane. The mixture was stirred at room temperature for 1½ hours and then heated on a steam bath for ¾ hour. The resulting amber colored solution was concentrated to a syrup and this syrup was taken up in 250 ml. boiling methanol. The solid which separated when the solution

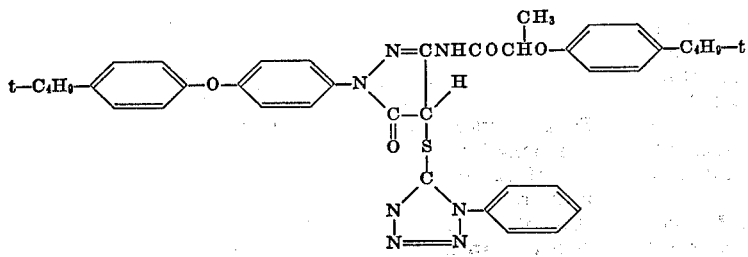

7.08 g. of 5,5'-bis(1-phenyltetrazolyl)disulfide (Ber. 28, 77–81) was suspended in 50 ml. dry carbon tetrachloride. A stream of dry chlorine gas was passed into the suspension for 45 minutes, and a pale yellow solution resulted. The solution was filtered and concentrated in vacuo to a yellow solid. This solid was then taken up in 5 ml. dry carbon tetrachloride and added all at once to a solution of 21 g. of 1-[4-(4-tert-butylphenoxy)phenyl] - 3 - [α-(4-tert-butylphenoxy)propionamido]-5-pyrazolone (U.S. Patent 2,369,489) in 200 ml. dry carbon tetrachloride. This yellowish solution was refluxed for 3 hours. The solvent was removed in vacuo. The residue was taken up in boiling cyclohexane, and after cooling to room temperature, a white solid separated. This solid was filtered and recrystallized twice from acetonitrile, M.P. 130–132° C.

(LXIII) α-Benzoyl-α-phenylthio-4-[N - (γ - phenylpropyl)-N-(p-tolyl)sulfamyl]acetanilide

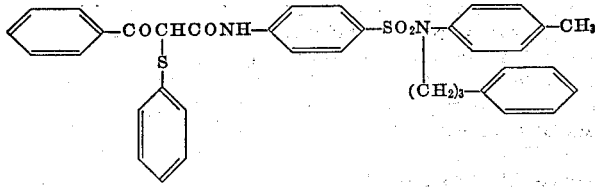

To a solution of 15.8 g. of α-benzoyl-4-[N-(γ-phenylpropyl)-N-(p-tolyl)sulfamyl]acetanilide (M.P. 128–130° C.) in 200 ml. dry dioxane was added 4.4 g. of benzenesulfur chloride in 10 ml. of dry dioxane at room temperawas cooled was collected and recrystallized from 100 ml. of acetic acid and twice from benzene, yielding 4 g. of product; M.P. 140–141° C.

(LXIX) α - {3 - [α - (2,4-di-tert-amylphenoxy)butyramido]benzoyl}-α-phenylthio-2-methoxyacetanilide

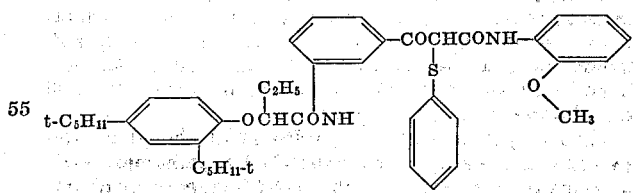

A solution of 14.5 g. of benzenesulfur chloride in 50 ml. of dry carbon tetrachloride was added dropwise to a solution of 59 g. of α-{3-[α-(2,4-di-tert-amylphenoxy)butyramido]benzoyl}-2-methoxy-acetanilide in 500 ml. of dry carbon tetrachloride which was cooled and stirred in an ice bath. The addition required about 30 minutes (hydrogen chloride was evolved). On completion of the addition, the mixture was stirred and allowed to warm to room temperature over a period of 3½ hours. It was then heated to reflux for 30 minutes and concentrated to a viscous amber syrup. To this syrup 100 ml. of ligroin was added and the solution was again concentrated down. To this was added 200 ml. ligroin. The solution was stirred gently at room temperature for 4 days. The solid which separated was filtered off and recrystallized from ligroin, yielding 25 g. of product; M.P. 91–92° C.

(LXXIII) 1 - [4 - (3,5 - dicarboxybenzamido)phenyl]-3 - ethoxy - 4 - (3 - octadecylcarbamylphenylthio) - 5-pyrazolone

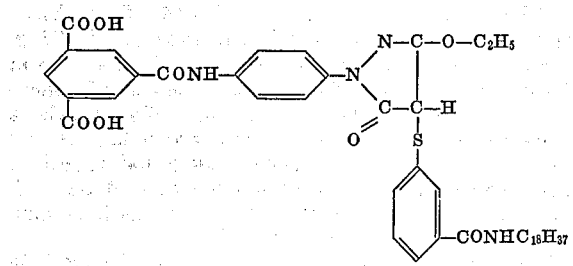

A mixture of 7.8 g. of Intermediate below, 25 ml. of ethyl alcohol, 15 ml. of 2 N aqueous NaOH, and 35 ml. of water was stirred at 85° C. for 15 minutes. The solution was cooled to room temperature and acidified with 1:2 concentrated HCl-water.

The solid which separated was filtered off, washed with water, acetonitrile, and recrystallized from methanol, yielding 4 g. of product; M.P. 200–202° C.

(LXXIII) Intermediate A—1 - (4 - nitrophenyl) - 3-ethoxy-5-pyrazolone.—A mixture of 31 g. of 4-nitrophenylhydrazine, 100 ml. of ethyl alcohol, and 38 g. of ethyl-β,β-diethoxyacrylate was refluxed for ½ hour. A solution of sodium ethoxide (prepared from 4.6 g. of sodium and 100 ml. of ethyl alcohol) was added and refluxed for another 20 minutes. This solution was acidified with glacial acetic acid and the solid which separated was filtered off, and recrystallized from 250 ml. of n-butyl alcohol, yielding 31 g. of product; M.P. 153–154° C.

(LXXIII) Intermediate B—1 - (4 - aminophenyl) - 3-ethoxy-5-pyrazolone.—A mixture of 15 g. of Intermediate A above in 150 ml. of ethyl alcohol was reduced using Pd/Charcoal at 50 p.s.i., hydrogen pressure.

The catalyst was filtered off and the solution poured into 500 ml. of water.

The product was filtered off and air dried, yielding 8.2 g. of product; M.P. 121–122° C.

(LXXIII) Intermediate C—Triethyltrimesate.—A mixture of 37 g. of trimesic acid (proc. N. Dak. Acad. SC: 8, 54, (1954); CA (1955) 8898b), 100 ml. of ethyl alcohol, 50 ml. of benzene, and 1 ml. of concentrated $H_2SO_4$ was refluxed through a 6″ packed column surmounted by a Dean Stark water spouter for 24 hours after which time the residue was cooled and the solid which crystallized was filtered and dried.

The yield of the triester was 38 g.; M.P. 133–135° C.

(LXXIII) Intermediate D—Diethyl ester of trimesic acid, (3,5-dicarbethoxybenzoic acid).—To a solution of 147 g. of the Intermediate C above in 2 liters of ethyl alcohol was added with stirring 250 ml. of 2 N NaOH in 500 ml. of ethyl alcohol. This mixture was refluxed for 30 minutes and stirred at room temperature for 12 hours, during which time a solid separated. This solid was filtered off and recrystallized from a mixture of 500 ml. of ethyl alcohol and 500 ml. of water, yielding 80 g. of product; M.P. 153–155° C.

(LXXIII) Intermediate E—3,5 - dicarbethoxybenzoyl chloride.—A mixture of 300 g. of Intermediate D above and 2 liters of thionyl chloride was refluxed for 2 hours, after which time it was concentrated in vacuo.

To the residue was added 250 ml. of dry benzene and again concentrated in vacuo.

The acid chloride thus formed was used as such in preparing Intermediate F below.

(LXXIII) Intermediate F—1 - [4 - (3,5 - dicarbethoxybenzamido)phenyl] - 3-ethoxy-5-pyrazolone.—A mixture of 6.6 g. of Intermediate B above and 8.5 g. of Intermediate E above and 100 ml. of dry acetonitrile was refluxed for 5 hours. The mixture was cooled to room temperature and the solid was filtered off, dried, and recrystallized from glacial acetic acid, yielding 10 g. of product; M.P. 200–201° C.

(LXXIII) Intermediate G—3 - octadecylcarbamylphenylsulfenyl chloride.—Into a suspension of 8 g. of 3,3' - dioctadecylcarbamyldiphenyldisulfide (Loria et al. U.S. patent application Ser. 154,841, filed Nov. 24, 1961) in 120 ml. of anhydrous carbon tetrachloride was bubbled dry chlorine gas for 1½ hours at room temperature, during which time all of the solid dissolved and a clear light yellow solution was formed. The solution was concentrated in vacuo to a volume of 50 ml. to remove excess chlorine.

This solution of the sulfenyl chloride was used as such in the following reaction (i.e., Intermediate H below).

(LXXIII) Intermediate H—1 - [4 - (3,5 - dicarbethoxybenzamido)phenyl] - 3 - ethoxy - 4 - (3 - octadecylcarbamylphenylthio) - 5 - pyrazolone.—A mixture of Intermediate G above and 9.35 g. of Intermediate F above in 200 ml. of dry dioxane was stirred at room temperature for 2 hours, heated to reflux for 1 hour, and concentrated in vacuo.

The residue was recrystallized from ethyl alcohol, yielding 8.5 g. of product; M.P. 156–158° C.

(LXXVIII) 1 - (4 - sulfophenyl) - 3 - (4 - sulfoanilino) - 4 - (3 - octadecylcarbamylphenylthio) - 5 - pyrazolone disodium salt

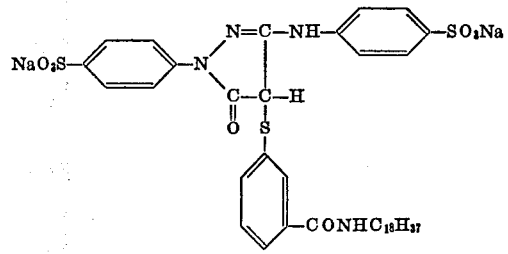

A suspension of 25 g. of Intermediate B below in 100 ml. of ethyl alcohol and 200 ml. of 2% aqueous NaOH was stirred at room temperature for ½ hour, during which time all solid dissolved. The solution was cooled and acidified with 5 ml. of acetic acid and concentrated in vacuo.

The crude solid residue was recrystallized from methyl alcohol, yielding 10 g. of product; decomp. >250° C.

(LXXVIII) Intermediate A—1 - (4 - fluosulfonylphenyl) - 3 - (4 - fluosulfonylanilino) - 5 - pyrazolone.—To 450 ml. of fluosulfonic acid at 5° C. was added with stirring 80 g. of 1-phenyl-3-anilino-5-pyrazolone.

The resultant solution was stirred at 50° C. for 4½ hours, then poured onto 2 kg. of crushed ice. The solid was collected, washed with water, filtered, and dissolved in 2 liters of ethyl acetate. This solution was washed with 5% sodium bicarbonate solution, water, and saturated brine.

It was concentrated in vacuo and the residue was recrystallized from acetonitrile, yielding 36 g. of product; decomp. at 290° C.

(LXXVIII) Intermediate B—1-(4-fluosulfonylphenyl)-3 - (4-fluosulfonylanilino)-4-(3-octadecylcarbamylphenylthio)-5-pyrazolone.—A mixture of Intermediate G of Coupler LXXIII above (prepared from 24.5 g. of the disulfide) and 25 g. of Intermediate A above in 320 ml. of dry carbon tetrachloride was stirred at 55° C. for 12 hours.

The solution was then concentrated in vacuo and the residue was recrystallized from 300 ml. of ethyl acetate yielding 25 g. of product; M.P. 209–211° C.

(XXCVI) α - benzoyl - α - (3 - octadecylcarbamylphenylthio)-3,5-dicarboxyacetanilide

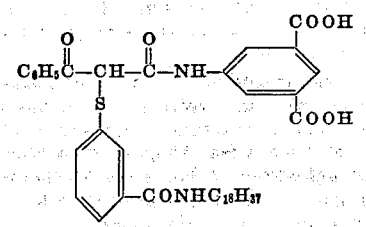

To a mixture of 7 g. of Intermediate A below in 100 ml. of dioxane at 50° C. was added a solution of 3-octadecylcarbamylphenylsulfenyl chloride (Intermediate G of Coupler LXXIII above, prepared from 8.1 g. of the disulfide), in 100 ml. of dioxane. This mixture was stirred for 12 hours after which time the solution was concentrated in vacuo. A solution of the gummy residue in 100 ml. of ethyl alcohol and 13 ml. of 2 N aqueous sodium hydroxide was heated at 40° C. for 1 hour after which time it was acidified with concentrated hydrochloric acid. The solid which separated was collected and recrystallized twice from ethyl alcohol, yielding 2 g. of product; M.P. 141–142° C.

(LXXVIII) Intermediate B—1 - (4 - fluosulfonylmethoxyacetanilide.—To a refluxing mixture of 102 g. of ethyl α-benzoylacetate and 5 g. of sodium acetate in 100 ml. of xylene was added 105 g. of dimethyl 5-aminoisophthalate. The resulting solution was refluxed under a steam condenser for 3 hours after which time it was concentrated to ½ the original volume and cooled to room temperature. The solid which separated was collected and recrystallized from methyl alcohol, yielding 40 g. of product; M.P. 165–167° C.

The other couplers of our invention can be similarly prepared using the appropriate intermediates.

The following table includes the melting points and analyses of typical mercaptan-releasing couplers listed and prepared as described above.

| Coupler number | Melting point, °C. | Calculated | | | | | Found | | | | |
|---|---|---|---|---|---|---|---|---|---|---|---|
| | | C | N | H | S | Cl | C | N | H | S | Cl |
| I | 81–82 | 76.2 | 2.4 | 7.8 | 5.5 | | 76.9 | 2.4 | 7.5 | 5.5 | |
| II | 112–113 | 70.6 | 4.4 | 7.0 | 5.1 | | 70.7 | 4.3 | 7.3 | 5.0 | |
| III | 156–157 | 70.6 | 4.4 | 7.0 | 5.1 | | 71.0 | 4.6 | 7.1 | 5.0 | |
| IV | 106–107 | 74.2 | 4.7 | 7.7 | 5.4 | | 74.0 | 4.6 | 7.5 | 5.3 | |
| V | 119–120 | 74.2 | 4.7 | 7.7 | 5.4 | | 74.1 | 4.8 | 7.9 | 5.0 | |
| VI | 132–134 | 73.0 | 4.7 | 7.5 | 5.0 | | 72.9 | 4.5 | 7.7 | 4.7 | |
| VII | 105–106 | 73.8 | 4.1 | 7.9 | 4.7 | | 73.6 | 4.0 | 7.6 | 4.8 | |
| VIII | 118–119 | 67.5 | 4.1 | 7.1 | 9.5 | | 67.6 | 4.0 | 7.0 | 9.6 | |
| IX | 129–130 | 67.5 | 4.1 | 7.1 | 9.5 | | 67.7 | 4.3 | 6.9 | 9.3 | |
| X | 148–149 | 71.3 | 4.4 | 6.9 | 10.0 | | 71.3 | 4.4 | 6.9 | 10.2 | |
| XI | 147–148 | 70.0 | 10.7 | 7.0 | 4.9 | | 70.2 | 10.8 | 7.1 | 5.0 | |
| XII | 182–183 | 68.8 | 3.7 | 6.8 | | | 68.9 | 3.4 | 7.0 | | |
| XIII | 196–198 | 57.2 | 3.5 | 6.3 | | 8.9 | 57.5 | 3.2 | 6.1 | | 9.0 |
| XIV | 173–174 | 68.2 | 3.8 | 6.9 | | | 68.0 | 3.9 | 6.6 | | |
| XV | 198–199 | 63.7 | 7.0 | 6.0 | | | 63.7 | 7.2 | 5.5 | | |
| XVI | 99–100 | 70.0 | 10.8 | 6.9 | 4.9 | | 70.1 | 10.8 | 7.0 | 4.7 | |
| XVII | 153–154 | 58.0 | | 3.7 | 11.9 | | 57.8 | | 3.9 | 12.1 | |
| XVIII | 220–221 | 60.5 | | 3.8 | 5.8 | | 60.3 | | 4.1 | 5.6 | |
| XIX | 240–241 | 59.3 | | 3.2 | 6.1 | | 59.1 | | 3.0 | 6.1 | |
| XX | 227–228 | 45.9 | | 2.8 | 13.5 | | 46.2 | | 3.0 | 13.2 | |
| XXI | ¹>200 | | 11.3 | | 12.9 | | | 11.5 | | 12.9 | |
| XXII | 197–198 | 47.5 | | 2.8 | 13.5 | | 47.2 | | 2.9 | 13.3 | |
| XXIII | ¹>200 | 45.0 | | 2.7 | 12.8 | | 44.9 | | 2.9 | 12.6 | |
| XXIV | 139–140 | 65.4 | 12.7 | 3.7 | | | 65.4 | 12.7 | 3.8 | | |
| XXV | 213–214 | 61.4 | 13.3 | 4.0 | | | 61.3 | 13.4 | 4.0 | | |
| XXVI | | 42.0 | | 2.5 | | 11.8 | 41.7 | | 2.5 | | 11.6 |
| XXVII | ¹>200 | 39.4 | 10.9 | 2.3 | | | 39.5 | 10.8 | 2.2 | | |
| XXVIII | 206–207 | 71.5 | 10.4 | 6.1 | | | 71.2 | 10.2 | 5.9 | | |
| XXIX | 159–160 | 67.9 | 9.9 | 6.6 | | | 68.1 | 10.1 | 6.5 | | |
| XXX | 166–167 | 72.0 | | 6.8 | 4.9 | | 71.8 | | 7.0 | 4.8 | |
| XXXI | ¹210 | 67.5 | | 5.5 | 3.5 | | 67.7 | | 5.2 | 3.7 | |
| XXXII | ¹200 | | | 5.3 | 3.7 | | | | 5.3 | 3.8 | |
| XXXIII | 120–121 | 68.4 | 8.7 | 7.5 | | | 68.6 | 8.5 | 7.4 | | |
| XXXIV | 77–78 | 68.1 | | 7.7 | 4.6 | | 67.9 | | 7.5 | 4.5 | |
| XXXV | 110–111 | 69.5 | 11.6 | 8.1 | | | 69.6 | 11.4 | 8.2 | | |
| XXXVI | 161–162 | 65.0 | 14.0 | 6.7 | | | 64.8 | 14.1 | 6.5 | | |
| XXXVII | 121–123 | 67.3 | 12.6 | 7.4 | | | 67.1 | 12.3 | 7.6 | | |
| XXXVIII | 136–137 | 59.6 | 13.2 | 5.4 | | | 59.8 | 13.4 | 5.4 | | |
| XXXIX | 108–109 | 67.6 | 16.2 | 8.2 | | | 67.4 | 16.4 | 8.4 | | |
| XL | ¹182 | 68.5 | 15.0 | 5.0 | | | 68.2 | 15.2 | 4.9 | | |
| XLI | 78–79 | 68.0 | 15.4 | 7.7 | | | 68.3 | 15.6 | 8.0 | | |
| XLII | 146–147 | 65.2 | 14.8 | 7.7 | | | 65.1 | 14.6 | 8.0 | | |
| XLIII | 130–132 | 66.6 | 13.8 | 5.9 | | | 66.4 | 14.0 | 5.8 | | |
| XLIV | 122–123 | 68.4 | 10.0 | 5.9 | 4.6 | | 68.1 | 10.3 | 6.1 | 4.4 | |
| XLV | 220–221 | 67.0 | | 5.8 | | | 66.9 | | 5.8 | | |
| XLVI | 113–114 | 64.3 | 12.0 | 5.7 | | | 64.5 | 12.1 | 5.9 | | |
| XLVII | 105–106 | 67.6 | 8.0 | 5.9 | | | 67.9 | 7.9 | 6.1 | | |
| XLVIII | 192–193 | 69.5 | 5.9 | 6.4 | | | 69.5 | 5.9 | 6.5 | | |
| XLIX | 126–127 | 68.9 | 6.2 | 6.1 | | | 68.8 | 6.3 | 5.9 | | |
| L | 92–93 | 69.2 | 8.3 | 6.0 | | | 69.4 | 8.4 | 6.2 | | |
| LI | 78–79 | 60.2 | 12.4 | 6.1 | 4.0 | | 60.2 | 12.3 | 5.9 | 3.9 | |
| LII | 123–124 | 68.2 | 5.5 | 8.5 | 3.1 | | 68.1 | 5.3 | 8.4 | 3.0 | |
| LIII | 165–166 | 67.0 | 13.6 | 8.2 | 4.5 | | 66.9 | 13.4 | 8.4 | 4.5 | |
| LIV | 182–183 | 64.4 | 15.4 | 7.4 | 5.0 | | 64.1 | 15.3 | 7.2 | 4.9 | |
| LV | 175–176 | 60.6 | 21.5 | 3.7 | | | 60.3 | 21.2 | 3.5 | | |
| LVI | 100–101 | 65.3 | 15.6 | 6.2 | | | 65.4 | 15.5 | 5.9 | | |
| LVII | 165–166 | 66.1 | 15.0 | 6.5 | 4.8 | | 65.8 | 14.8 | 6.4 | 4.7 | |
| LVIII | 300–301 | 58.3 | 9.7 | 4.2 | 5.5 | | 58.6 | 9.5 | 4.6 | 5.4 | |
| LIX | 75–76 | 67.0 | 15.2 | 7.9 | 4.9 | | 67.3 | 15.4 | 8.0 | 4.7 | |
| LX | 199–200 | 58.2 | 13.2 | 4.9 | 3.8 | | 58.3 | 13.3 | 5.1 | 3.7 | |
| LXI | 174–175 | 65.9 | 6.5 | 7.3 | 3.0 | | 65.9 | 6.6 | 7.1 | 2.9 | |
| LXII | 108–109 | 57.3 | 12.9 | 6.1 | 4.9 | | 57.6 | 13.0 | 6.5 | 4.8 | |
| LXIII | 154–155 | 70.0 | 4.4 | 5.4 | 10.1 | | 70.2 | 4.7 | 5.6 | 10.3 | |
| LXIV | 140–141 | 65.5 | 6.2 | 4.9 | 9.5 | | 65.2 | 6.5 | 5.1 | 9.3 | |
| LXV | 110–111 | 72.5 | 4.5 | 7.7 | 6.9 | | 72.2 | 4.6 | 7.8 | 7.1 | |
| LXVI | 70–71 | 65.8 | 5.8 | 4.8 | | | 65.6 | 6.0 | 4.8 | | |
| LXVII | ¹155 | 57.5 | | 3.3 | 6.6 | | 57.5 | | 3.5 | 6.5 | |
| LXVIII | ¹>240 | 70.2 | | 4.3 | 8.4 | | 70.0 | | 4.3 | 8.4 | |
| LXIX | 91–92 | 72.6 | 4.1 | 7.3 | 4.6 | | 72.8 | 4.3 | 7.2 | 4.3 | |
| LXX | ¹220 | 63.4 | 3.2 | 3.9 | 7.4 | | 63.2 | 3.0 | 3.8 | 7.3 | |
| LXXI | ¹230 | 58.8 | 3.0 | 3.4 | 6.8 | | 58.6 | 3.0 | 3.7 | 6.8 | |
| LXXII | ¹>275 | 54.0 | 3.3 | 6.1 | 11.1 | | 54.2 | 3.2 | 6.0 | 11.3 | |
| LXXIII | 200–202 | 65.2 | 6.6 | 7.4 | 3.8 | | 65.2 | 6.5 | 7.4 | 3.9 | |
| LXXIV | 165–166 | 64.4 | 7.9 | 7.4 | 4.5 | | 64.1 | 7.7 | 7.6 | 4.2 | |

See footnotes at end of table.

TABLE—Continued

| Coupler number | Melting point, °C. | Analysis | | | | | | | | | |
|---|---|---|---|---|---|---|---|---|---|---|---|
| | | Calculated | | | | | Found | | | | |
| | | C | N | H | S | Cl | C | N | H | S | Cl |
| LXXV | ¹ 225 | 63.4 | 7.6 | 7.4 | 4.3 | | 63.2 | 7.8 | 7.7 | 4.2 | |
| LXXVI | ¹ 300 | 66.9 | 7.3 | 7.1 | 4.2 | | 67.0 | 7.6 | 7.2 | 4.2 | |
| LXXVII | 159-160 | 67.9 | 7.5 | 7.3 | 4.3 | | 67.6 | 7.5 | 7.0 | 4.3 | |
| LXXVIII | ¹ >250 | 54.2 | 6.3 | 6.2 | 10.8 | | 54.1 | 6.1 | 6.5 | 10.7 | |
| LXXIX | 180-182 | 63.4 | 9.5 | 7.5 | 4.3 | | 63.7 | 9.5 | 7.4 | 4.3 | |
| XXC | 194-195 | 57.1 | 8.1 | 6.2 | 11.2 | | 57.2 | 8.2 | 6.5 | 11.1 | |
| XXCI | ¹ 250 | 65.7 | 8.7 | 7.0 | 4.0 | | 66.0 | 8.5 | 7.3 | 3.8 | |
| XXCII | 180-182 | 64.2 | 4.9 | 6.7 | 7.5 | | 64.1 | 4.8 | 6.9 | 7.6 | |
| XXCIII | ¹ >200 | 57.1 | 4.2 | 6.7 | 14.3 | | 57.3 | 4.0 | 7.0 | 14.0 | |
| XXCIV | ¹ >275 | 56.6 | 4.2 | 5.8 | 9.6 | | 56.6 | 4.5 | 6.0 | 9.3 | |
| XXCV | ¹ 245 | 63.1 | 3.7 | 7.0 | 8.4 | | 63.2 | 3.6 | 7.3 | 8.6 | |
| XXCVI | 141-142 | 69.2 | 3.8 | 7.5 | 4.4 | | 69.5 | 3.7 | 7.6 | 4.2 | |
| XXCVII | ¹ >275 | 56.6 | 4.2 | 5.8 | 9.6 | | 56.7 | 3.9 | 6.0 | 9.8 | |
| XXCVIII | ¹ 195 | 54.3 | 3.1 | 5.9 | 10.6 | | 54.6 | 3.0 | 6.0 | 10.3 | |
| XXCIX | 84-85 | 65.0 | 4.8 | 6.9 | 7.2 | | 64.7 | 4.7 | 7.0 | 6.9 | |
| XC | ¹ >200 | 59.5 | 4.8 | 7.0 | | | 59.7 | 4.7 | 7.4 | | |
| XCI | 209-210 | 69.9 | 3.6 | 7.8 | 4.2 | | 70.2 | 3.8 | 8.0 | 4.0 | |
| XCII | 213-214 | 68.5 | 3.6 | 7.7 | 4.0 | | 68.8 | 3.6 | 7.9 | 4.1 | |
| XCIII | 134-135 | 59.0 | 4.4 | 6.1 | 10.0 | | 58.8 | 4.3 | 6.3 | 9.9 | |
| XCIV | 188-189 | 63.0 | 3.5 | 6.6 | 4.0 | | 62.9 | 3.7 | 6.9 | 4.2 | |
| XCV | ¹ >200 | 53.6 | | 5.7 | 10.7 | | 53.6 | | 5.6 | 10.6 | |
| XCVI | 66-67 | 67.9 | 3.7 | 7.4 | 4.2 | | 67.8 | 3.5 | 7.6 | 4.3 | |
| XCVII | ¹ >200 | 63.5 | 1.8 | 7.0 | 8.3 | | 63.4 | 1.8 | 6.9 | 8.3 | |
| XCVIII | ¹ >200 | 59.7 | 3.6 | 7.3 | 8.2 | | 59.9 | 3.5 | 7.5 | 7.9 | |
| XCIX | ¹ >200 | 60.2 | 4.0 | 7.3 | 9.2 | | 59.9 | 4.2 | 7.0 | 9.1 | |
| C | 219-220 | 68.5 | 3.6 | 7.1 | 4.2 | | 68.2 | 3.8 | 7.3 | 4.3 | |
| CI | ¹ >300 | 59.7 | 3.7 | 6.7 | 12.6 | | 59.6 | 3.4 | 7.0 | 12.4 | |
| CII | ¹ >270 | 60.8 | | 6.9 | 8.5 | | 60.9 | | 7.0 | 8.6 | |
| CIII | ¹ >250 | 66.5 | 3.5 | 7.0 | 8.0 | | 66.6 | 3.7 | 7.1 | 8.0 | |
| CIV | 60-61 | 69.5 | 3.7 | 7.7 | 4.2 | | 69.4 | 3.6 | 7.8 | 4.1 | |
| CV | 219-220 | 66.1 | 2.7 | 7.1 | 6.1 | | 66.0 | 2.7 | 7.0 | 6.1 | |
| CVI | ¹ 210 | 62.1 | 3.6 | 7.0 | 8.1 | | 62.1 | 3.8 | 7.3 | 8.0 | |
| CVII | 116-117 | 69.7 | 3.7 | 7.7 | 4.2 | | 69.8 | 3.7 | 7.9 | 4.2 | |
| CVIII | ¹ >300 | 52.5 | 3.2 | 5.8 | 11.0 | | 52.6 | 3.3 | 5.9 | 11.1 | |
| CIX | 112-113 | 65.70 | 10.96 | 6.17 | | | 65.70 | 10.70 | 5.90 | | |
| CX | 155-156 | 66.6 | 11.6 | 6.0 | | | 66.7 | 11.3 | 6.0 | | |
| CXI | 212-213 | 70.1 | | 6.7 | 4.3 | | 69.8 | | 6.9 | 4.3 | |
| CXII | 78-79 | 65.2 | 14.7 | 6.0 | | | 64.9 | 14.5 | 5.8 | | |

¹ Decomposition.

The invention has been described in considerable detail with particular reference to preferred embodiments thereof, but it will be understood that variations and modifications can be effected within the spirit and scope of the invention as described hereinabove and as defined in the appended claims.

This application is a continuation-in-part application of our copending applications U.S. Ser. No. 817,860 filed June 3, 1959; U.S. Ser. No. 126,782 filed June 29, 1961; U.S. Ser. No. 126,783 filed June 29, 1961; and U.S. Ser. No. 244,774 filed Dec. 14, 1962.

We claim:

1. A photographic color coupler capable of forming a dye and a mercaptan when reacted with oxidized aromatic primary amino color developing agent and having the formula COUP—S—R wherein COUP is a photographic color coupler radical selected from the group consisting of a 5-pyrazolone coupler radical and an open-chain ketomethylene coupler radical, COUP having substituted in its coupling position the monothio radical; and R is an organic radical incapable of forming a dye with said oxidized developing agent and being selected from the group consisting of an alkyl radical, a cycloalkane radical, an aryl radical and a heterocyclic radical containing at least one hetero atom selected from the group consisting of oxygen, sulfur nd nitrogen.

2. A photographic color coupler capable of forming a dye and a mercaptan when reacted with oxidized aromatic primary amino color developing agent and having the formula COUP—S—R wherein COUP is a 5-pyrazolone photographic color coupler radical having substituted in its coupling position the monothio radical, and R is a phenyl radical incapable of forming a dye with said oxidized developing agent.

3. A photographic color coupler capable of forming a dye and a mercaptan when reacted with oxidized aromatic primary amino color developing agent and having the formula COUP—S—R wherein COUP is a 5-pyrazolone photographic color coupler radical having substituted in its coupling position the monothio radical, and R is a heterocyclic radical having 1 to 4 hetero-nitrogen atoms and being incapable of forming a dye with said oxidized color developing agent.

4. A photographic color coupler as described in claim 3 wherein the heterocyclic radical is a 2-benzothiazolyl radical.

5. A photographic color coupler as described in claim 3 wherein the heterocyclic radical is a 5-phenyl-1,3,4-oxadiazolyl radical.

6. A photographic color coupler as described in claim 3 wherein the heterocyclic radical is a 1-phenyl-5-tetrazolyl radical.

7. A photographic color coupler capable of forming a dye and a mercaptan when reacted with oxidized aromatic primary amino color developing agent and having the formula COUP—S—R wherein COUP is an open-chain ketomethylene photographic color coupler radical having substituted in its coupling position the monothio radical, and R is a phenyl radical incapable of forming a dye with said oxidized developing agent.

8. A photographic color coupler capable of forming a dye and a mercaptan when reacted with oxidized aromatic primary amino color development agent and having the formula COUP—S—R wherein COUP is an open-chain ketomethylene photographic color coupler radical having substituted in its coupling position the monothio radical, and R is a heterocyclic radical having 1 to 4 hetero-nitrogen atoms and being incapable of forming a dye with said oxidized color developing agent.

9. A photographic color coupler as described in claim 8 wherein the heterocyclic radical is 1-phenyl-5-tetrazolyl.

10. A photographic color coupler as described in claim 8 wherein the heterocyclic radical is a 2-benzothiazolyl radical.

11. A photographic color coupler as described in claim 8 wherein the heterocyclic radical is a 5-phenyl-1,3,4-oxadiazolyl radical.

12. 1-[4-(4- - tert-butylphenoxy)phenyl]-3-[α - (4-tert-butylphenoxy)propionamido] - 4 - (1-phenyl-5-tetrazolylthio)-5-pyrazolone.

13. α-Benzoyl - α - (3-octadecylcarbamylphenylthio)-3,5-dicarboxyacetanilide.

14. α-Benzoyl - α - phenylthio-4-[N-(γ-phenylpropyl)-N-(p-tolyl)sulfamyl]acetanilide.

References Cited
UNITED STATES PATENTS

| | | |
|---|---|---|
| 2,853,424 | 9/1958 | Priewe et al. |
| 2,903,461 | 9/1959 | Smith. |
| 3,150,166 | 9/1964 | Pohlemann et al. |

ALEX MAZEL, Primary Examiner

K. J. GALLAGHER, Assistant Examiner

U.S. Cl. X.R.

260—247.1, 306, 306.6, 307 D, 307 G, 310 A, 332.3 C, 346.2 R, 347.2, 397.7, 470, 507 R, 511, 516, 556 B, 558 S, 559 D, 590